United States Patent [19]
Reddy

[11] Patent Number: 5,684,686
[45] Date of Patent: *Nov. 4, 1997

[54] BOOST-INPUT BACKED-UP UNINTERRUPTIBLE POWER SUPPLY

[75] Inventor: Anantha Baddam Reddy, San Diego, Calif.

[73] Assignee: Deltec Electronics Corporation, San Diego, Calif.

[*] Notice: The term of this patent shall not extend beyond the expiration date of Pat. No. 5,424,936.

[21] Appl. No.: 486,524

[22] Filed: Jun. 7, 1995

Related U.S. Application Data

[63] Continuation-in-part of Ser. No. 180,308, Jan. 12, 1994, Pat. No. 5,424,936.

[51] Int. Cl.[6] .............................. H02M 3/24; H02J 7/00
[52] U.S. Cl. ................................... 363/97; 307/66
[58] Field of Search ............................ 363/34, 37, 89, 363/97; 323/222; 307/64, 65, 66

[56] References Cited

U.S. PATENT DOCUMENTS

| | | | |
|---|---|---|---|
| 3,742,330 | 6/1973 | Hodges et al. | 321/9 |
| 3,768,000 | 10/1973 | Bates | 321/27 |
| 4,366,390 | 12/1982 | Rathmana | 307/66 |
| 4,395,639 | 7/1983 | Karl-Birgerbring | 307/66 |
| 4,818,891 | 4/1989 | Drinkwater | 307/64 |
| 4,935,861 | 6/1990 | Johnson et al. | 363/132 |
| 5,126,585 | 6/1992 | Boys | 307/66 |
| 5,241,217 | 8/1993 | Severinsky | 307/64 |
| 5,347,164 | 9/1994 | Yeh | 307/66 |
| 5,384,792 | 1/1995 | Hirachi | 307/66 |

*Primary Examiner*—Matthew V. Nguyen
*Attorney, Agent, or Firm*—Woodcock Washburn Kurtz Mackiewicz & Norris LLP

[57] ABSTRACT

A boost-input backed-up uninterruptable power supply from an input voltage source, such as a 60 cycle 120/240 Vac service, provides an uninterrupted output voltage to a load connected to a return. The backed-up power supply has an input rectifier and low energy storage filter coupled to the input voltage source for converting the input voltage source into at least an unregulated positive dc voltage source, and an unregulated negative dc voltage source. Each respective unregulated source has a respective unregulated dc voltage value with respect to the return. Two 120V battery stacks provides respective positive and negative battery voltages at corresponding positive and negative battery output terminals. A diode isolates the unregulated positive and negative dc voltage sources from their respective battery voltages for unregulated voltage source values equal to or greater than their respective battery voltages and clamps the unregulated dc voltage values to their respective battery voltages in response to loss of the sinusoidal input voltage source. A boost regulator receives power from the unregulated positive and negative dc voltage sources and provides a positive and a negative regulated dc voltage with respect to the return. A dc-to-ac converter receives a reference signal and converts the positive and negative regulated dc voltage into at least a first uninterrupted output voltage for application to the load.

16 Claims, 17 Drawing Sheets

1

BOOST-INPUT BACKED-UP UNINTERRUPTIBLE POWER SUPPLY

This application is a continuation-in-part of application Ser. No. 08/180,308, filed Jan. 12, 1994, now U.S. Pat. No. 5,424,936, issued Jun. 13, 1995 having a common sole inventor and assignee.

BACKGROUND

This invention relates to the field of uninterruptible power supplies that are powered from single or multi-phase power from electrical mains ac service. The uninterruptible power supply provides single multi-phase ac electrical service to a load without substantial interruption in the event of short term interruption of the mains ac service.

RELATED ART

The "Uninterruptible Power Supplies" described in U.S. Pat. 5,126,585, issued Jun. 30, 1992 to J. T. Boys teaches the use of "a reversible rectifiers connected between an AC supply and a high voltage internal DC bus," and a second reversible rectifier interconnecting storage batteries to the high voltage DC bus . . .". The reversible rectifier may be the means "for reversibly converting an incoming alternating current at first AC voltage into a direct current . . ." The object of the invention by Boys is to provide an output load with an ac voltage service while reflecting a unity power factor back to the ac voltage service providing power to its input. According to the Boys reference, the reversible rectifier is of a type that the instantaneous current consumption of the Boys UPS mimics a pure resistance causing minimal harmonic pollution of the utility supply.

Unlike the Boys UPS, the subject invention uses a conventional rectifier input and increases the reflected power factor to near unity. The topology of the Boys UPS shows the use of two pairs of switches in separate pairs. The first pair operates within a first reversible rectifier to source power from the input ac voltage source as ac current to a +dc voltage bus and −dc voltage bus. The peak operating voltage of each of these dc busses is maintained above the peak swing of the ac voltage source providing power to the Boys UPS. The second reversible rectifier sources power from a 210 volt storage battery stack to the +dc bus and the −dc bus in the event of loss of ac voltage from the input power source.

The subject invention uses a pair of boost converters, each boost converter using a single switch. Each boost converter is either powered from a respected D+ unregulated bus or an D− unregulated bus formed at the output of a full bridge input rectifier or from a source selected battery source in the event of loss of input ac voltage. Each boost converter uses a single boost choke. The positive and negative outputs of the full bridge use only high frequency capacitive filtering, so the output voltages at the D+ and D− nodes appear as substantially unfiltered rectifier outputs.

The output of each boost regulator provides power to a respective regulated +DC or −DC bus. A positive and negative battery stack is used. Power factor correction is achieved by the use of intelligent PWM Controllers that sample the input ac voltage service and schedule the power conversion rate from the unregulated bus to the regulated bus to substantially remain in phase with the input the input ac voltage. Transformers are added to provide an inverted full wave rectified signal to the intelligent PWM Controller for the negative boost circuit.

SUMMARY OF THE INVENTION

A first object of the invention boost-input backed-up uninterruptible power supply is to use an input rectifier and a small capacitive filter coupled to an input voltage source to convert the input voltage source into at least an unregulated positive dc voltage source and an unregulated negative dc voltage source. Each boost converter uses a single boost inductor. No input filter inductor or large energy storage capacitors filter the outputs of the input full wave rectifiers. The parent co-pending application, Ser. No. 08/180,308, filed Jan. 12, 1994, now U.S. Pat. No. 5,424,936, issued Jun. 13, 1995, taught the use of a large filter inductor interposed between the unregulated full wave rectifier output and the input to the respective boost regulators. This improved topology is less costly be more reliable due to the elimination of the large filter inductors. Each respective unregulated source has a respective unregulated dc voltage value with respect to the return. A positive and negative battery referenced to the return provide respective positive and negative battery voltages at corresponding positive and negative battery output terminals.

A current switch, such as a clamp or blocking diode, a semiconductor switch or a relay actuated switch isolates the unregulated positive and negative dc voltage sources from their respective battery voltages for unregulated voltage source values equal to or greater than their respective battery voltage. The battery voltages are raised from 48 V to 120 V to permit the duty cycle of the boost regulator switches from operating with an on-time of over 50%. The current switch means clamps the unregulated dc voltage values to their respective battery voltage in response to loss of the sinusoidal input voltage source.

It is a second object of the invention backed-up power supply to provide a boost regulator comprising a positive and negative boost circuit coupled to receive power from the unregulated positive and negative dc voltage sources to provide positive and negative regulated dc voltage with respect to a return or neutral.

It is a third object of the backed-up power supply to use a dc-to-ac converter responsive to a reference signal and coupled to convert the positive and negative regulated dc voltage into at least a first uninterrupted output voltage for application to a load. The uninterrupted output voltage is continuously sampled and scaled to provide an output voltage sense signal. The output voltage sense signal is combined with the reference signal to provide an amplified error signal. The dc-to-ac converter is further characterized to continuously adjust and scale the output voltage in amplitude and phase to minimize the amplified error signal.

PREFERRED EMBODIMENT

Figure 1:
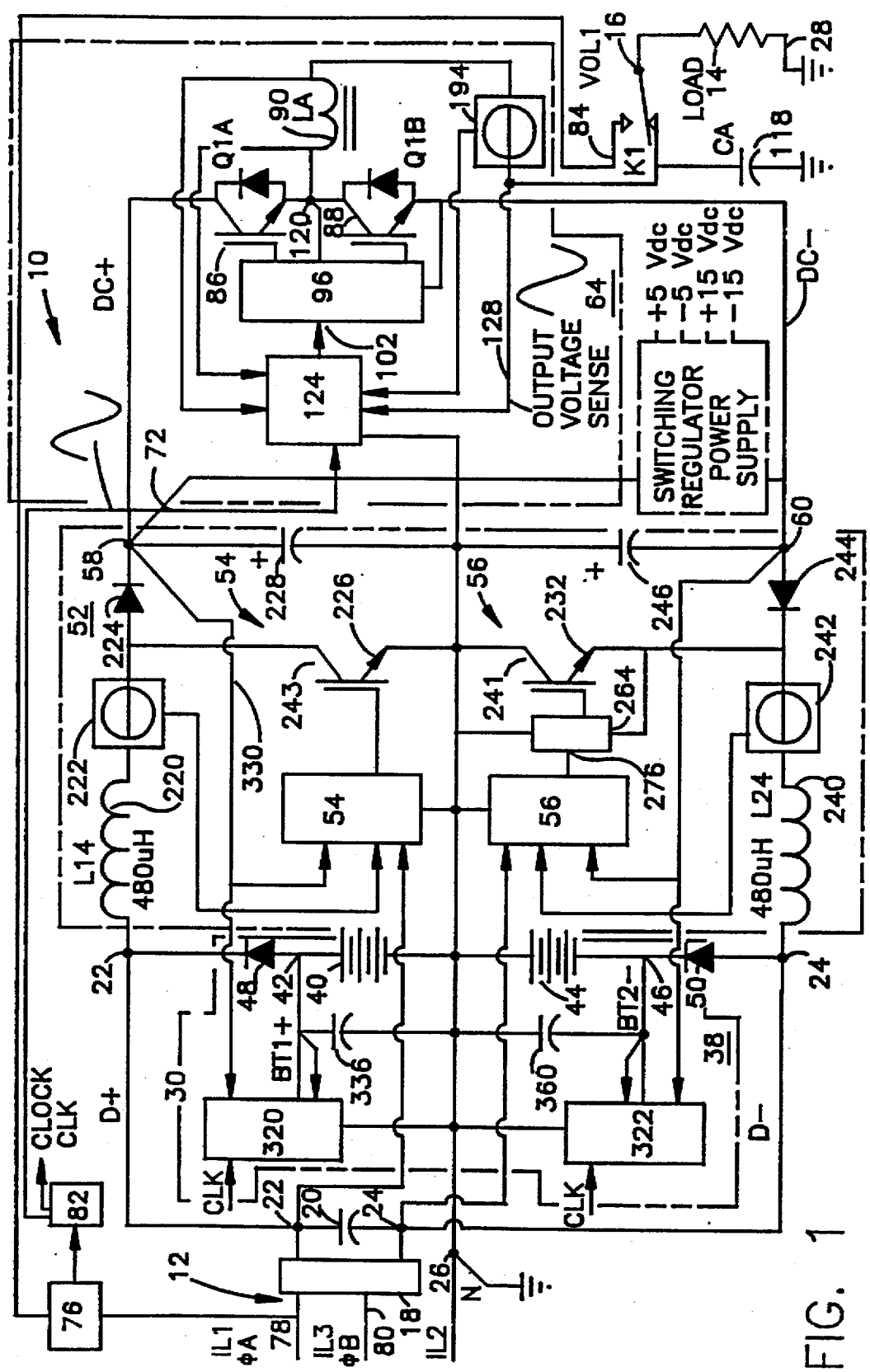
FIG. 1 is a schematic block diagram of a boost-input backed-up uninterruptible power supply powered from a two-phase sinusoidal input voltage source for providing an uninterrupted output voltage to a load.
Figure 2:
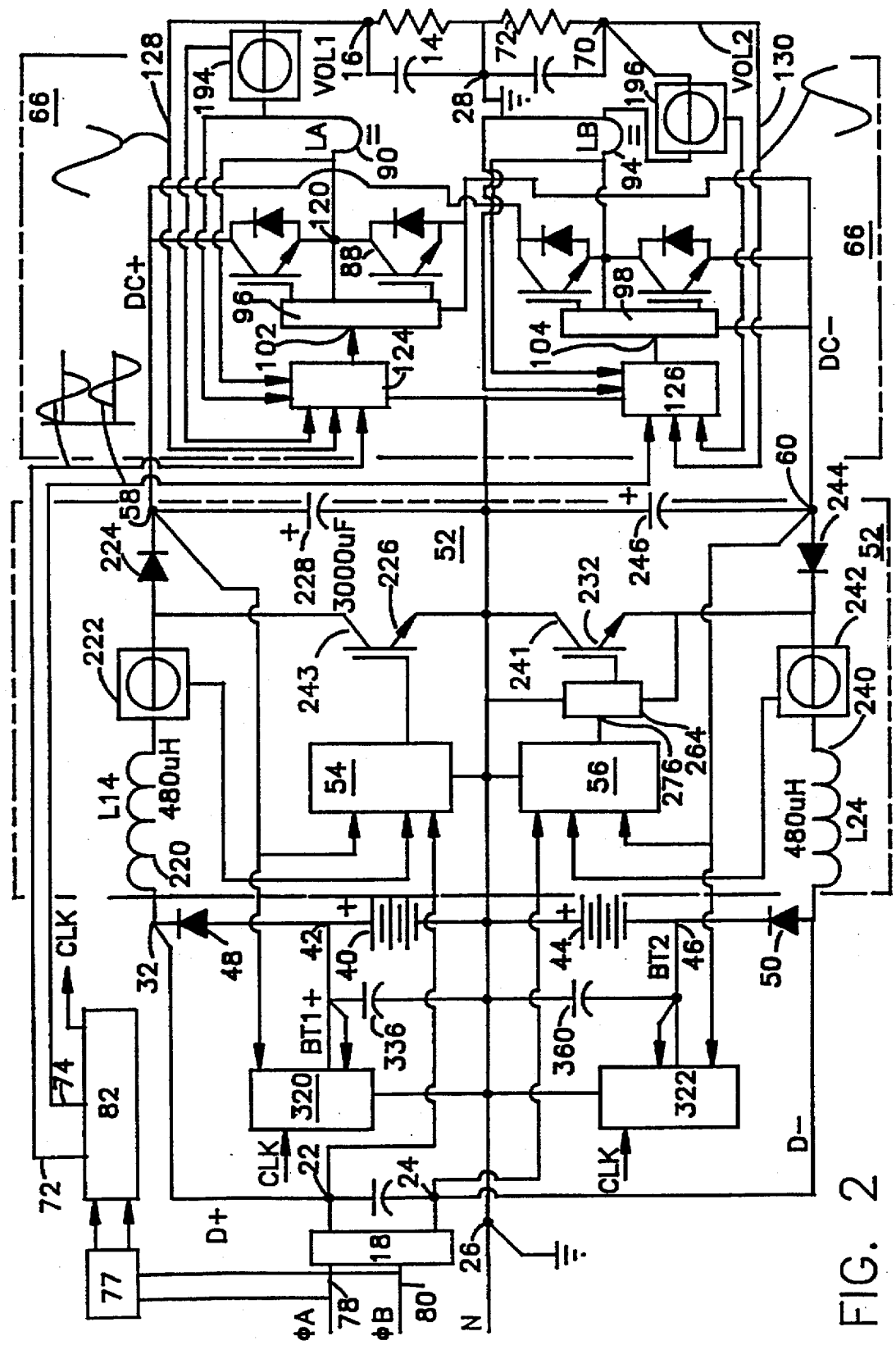
FIG. 2 is a schematic block diagram of a boost-input backed-up uninterruptible power supply powered from a two-phase sinusoidal input voltage source for providing a first and second uninterrupted sinusoidal output voltages to respective loads (a second embodiment)

FIGS. 1 and 2 show alternative embodiments of the invention boost-input backed-up uninterruptible power supply sinusoidal power supply 10 powered from an input voltage source 12 for providing an uninterrupted sinusoidal output voltage to load 14 at output terminal 16. In the embodiment of FIG. 1, the input voltage source input power is from a two-phase 60 Hz 120 Vac service from a utility grid shown as φA (phase A) and φB (phase B).

Block 18 in combination with high frequency capacitor filter 20 represents an input rectifier and filter means that comprises a conventional bridge rectifier, RFI filter, transient suppressor and fusing means (not shown) coupled to receive the input voltage source, φA and φB ac voltage and for converting the input voltage source into at least a substantially unfiltered and unregulated positive dc voltage source for providing an unregulated positive dc voltage, D+ at the D+ terminal 22 and a substantially unfiltered and unregulated negative dc voltage source providing an unregulated negative dc voltage D–, at the D– terminal 24.

The unregulated positive and negative voltage sources maintain respective unregulated dc voltage values at D+ terminal 22 and D– terminal 24 with respect to a return, such as the neutral or ground terminal 26. In the embodiments of FIGS. 1 and 2, the load return terminal 28 for the load 14 is electrically common with neutral terminal 24. Those in the art will understand that the load return 28 could be isolated from the neutral by the use of an isolation transformer (not shown). The primary winding of the isolation transformer would be connected between the first phase output terminals 16 and neutral terminal 26. The load 14 would be driven by the secondary of the isolation transformer. The load return terminal 28 could be isolated from the neutral terminal 26 with this arrangement if required.

In the parent application, a positive filter inductor and negative filter inductor coupled the D+ terminal 22 and the D– terminal 24 to the inputs of respective boost regulators. This improved boost-input backed-up uninterruptible power supply design has merged the respective positive and negative filter inductors into single respective boost inductors thereby reducing the parts count. The positive and negative filter inductors typically had high inductance values in the hundreds of microhenries. The combined boost inductors also have inductance values in the hundreds of micro henry and are sized to provide current smoothing for current being sourced from the filtered D+ output terminal 22 or sunk from the filtered D– output terminal 24. The boost converters typically operate in the continuous mode.

The elements within phantom block 38 represent a battery means, referenced to the neutral terminal or return 26, and having a first battery 40 for providing a positive battery voltage, BT1+ at a first battery positive output terminal, BT1+ terminal 42 and a second battery 44 for providing a negative battery voltage, BT1– at a corresponding second battery negative output terminal, BT1– terminal 46.

Current is sourced to the D+ output terminal 32 from the first battery 40 when the voltage at the D+ output terminal 32 drops below the positive battery voltage BT1+. Current is sunk into the D– output terminal 36 from a second battery 44 when the voltage at the D– output terminal 36 drops below the positive battery voltage BT1–.

Positive current switch diode 48 and negative current switch diode 50 represent a current switch means having a positive current switch 48 and a negative current switch 50 for isolating (switch open) the unregulated positive and negative dc voltage source voltages at D+ terminal 22 and D– terminal 24 from their respective positive and negative battery voltages, BT1+ and BT1–, for unregulated positive and negative dc voltage source voltages, D+ and D–, equal to or greater than the battery voltages, BT1+ and BT1–.

The current switch diodes become forward biased (switch closed) and clamp the unregulated dc voltage values at the D+ output terminal 32 and the D– output terminal 36 to substantially equal the respective positive and negative battery voltages at terminals 42 and 46 in response to loss of the sinusoidal input voltage source φA and φB. Positive current switch diode 48 is back biased for unregulated positive dc voltage source values greater than the positive battery voltage value. Negative current switch diode 50 is back biased for unregulated negative dc voltage source values greater than the negative battery voltage value. To stop the batteries 40, 44 from discharging, boost logic is turned off by microprocessor controller 82 during the low input mains voltages as shown in FIGS. 9b and 9c as intervals A and B for the positive boost regulator circuit 54 and the negative boost regulator 56 circuits respectively.

The elements within phantom block 52 represents a boost regulator means coupled to receive power from the unregulated positive and negative dc voltage sources at voltages D+ and D–. In the event of loss of either or both of the unregulated positive and negative dc voltage sources, D+ and D–, power is obtained from the first and second batteries at the positive and negative battery output terminals 42 and 46 via corresponding positive current switch 48 or negative current switch 50 to the respective D+ output terminal 22 and the D– output terminal 24.

Those in the art will understand that the current switches 48, 50 operate to provide a source selection function between dc sources for the respective inputs of a positive boost converter 54 and a negative boost converter 56 within the boost regulator means 52. Other source selectors, such as solid state switches, or solid state switches operating in parallel with relay switches might be employed with adequate sensing and control circuit.

The diode arrangement of diodes 48 and 50 is believed to be the best mode for practicing a current switch because of its simplicity and low cost; however, as known by those in the art, source selection is possible using relays, or other semiconductor devices such as transistors or FETS in combination with threshold detection circuits and appropriate drivers and blocking devices where necessary. It is also known in the art that relay contacts can be used to bridge semiconductor switching devices for the purpose of reducing the forward voltage drop associated with diodes or SCRs or the saturated voltage drop associated with semiconductor switching devices such as transistors.

Figure 8:
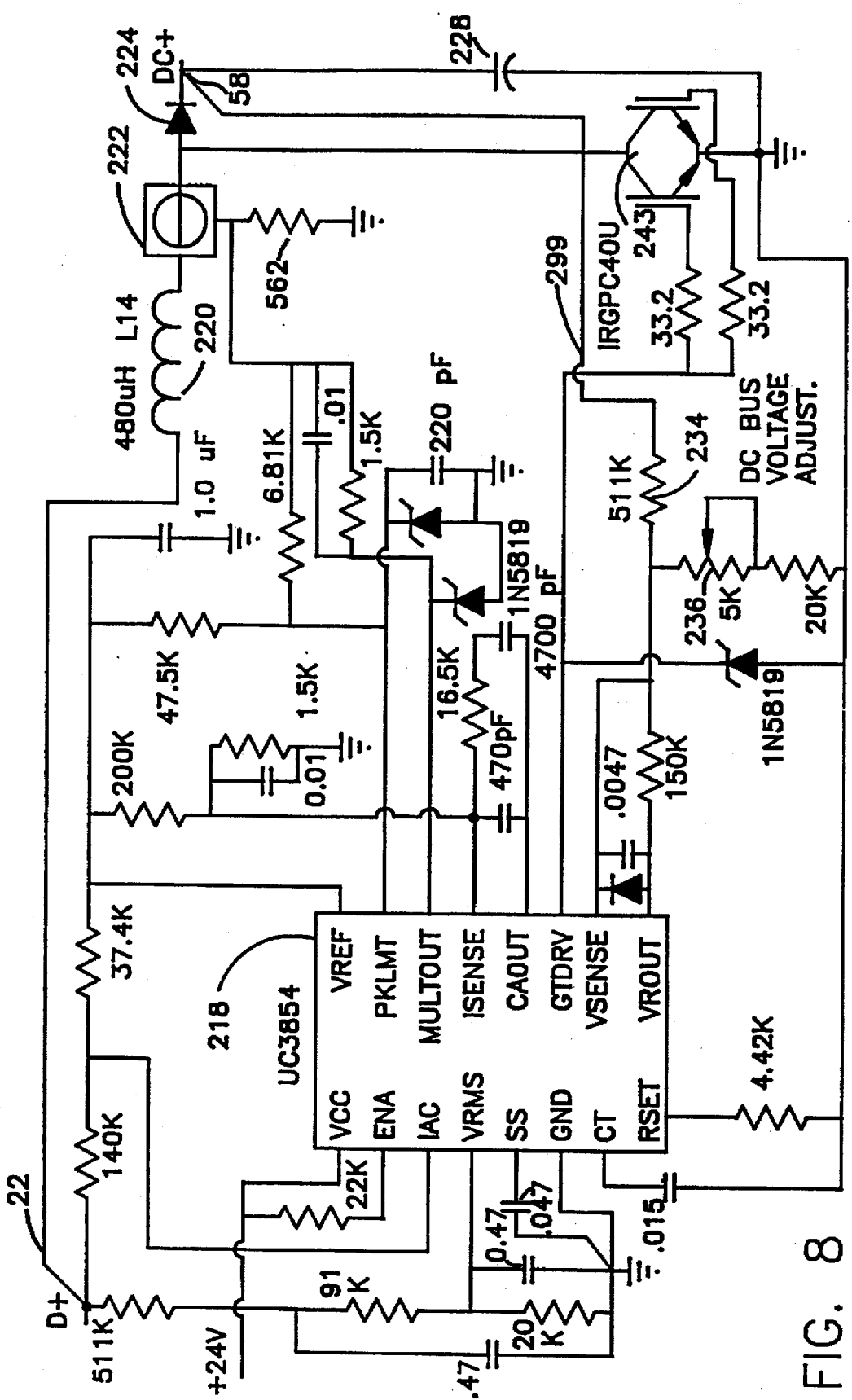
FIG. 8 is a schematic of a positive boost regulator.
Figure 10:
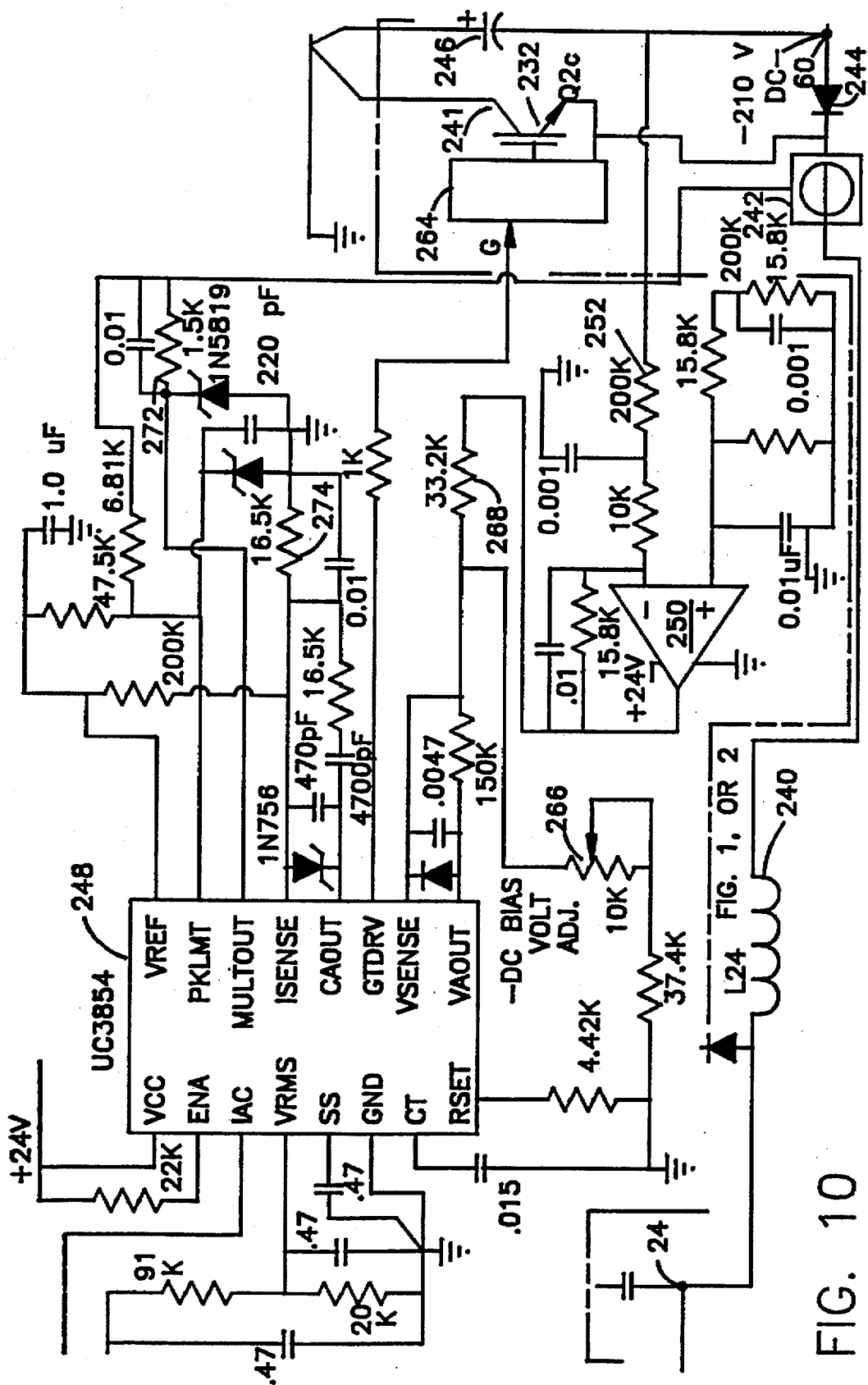
FIG. 10 is a schematic of a negative boost regulator with output voltage sensing.
Figure 11:
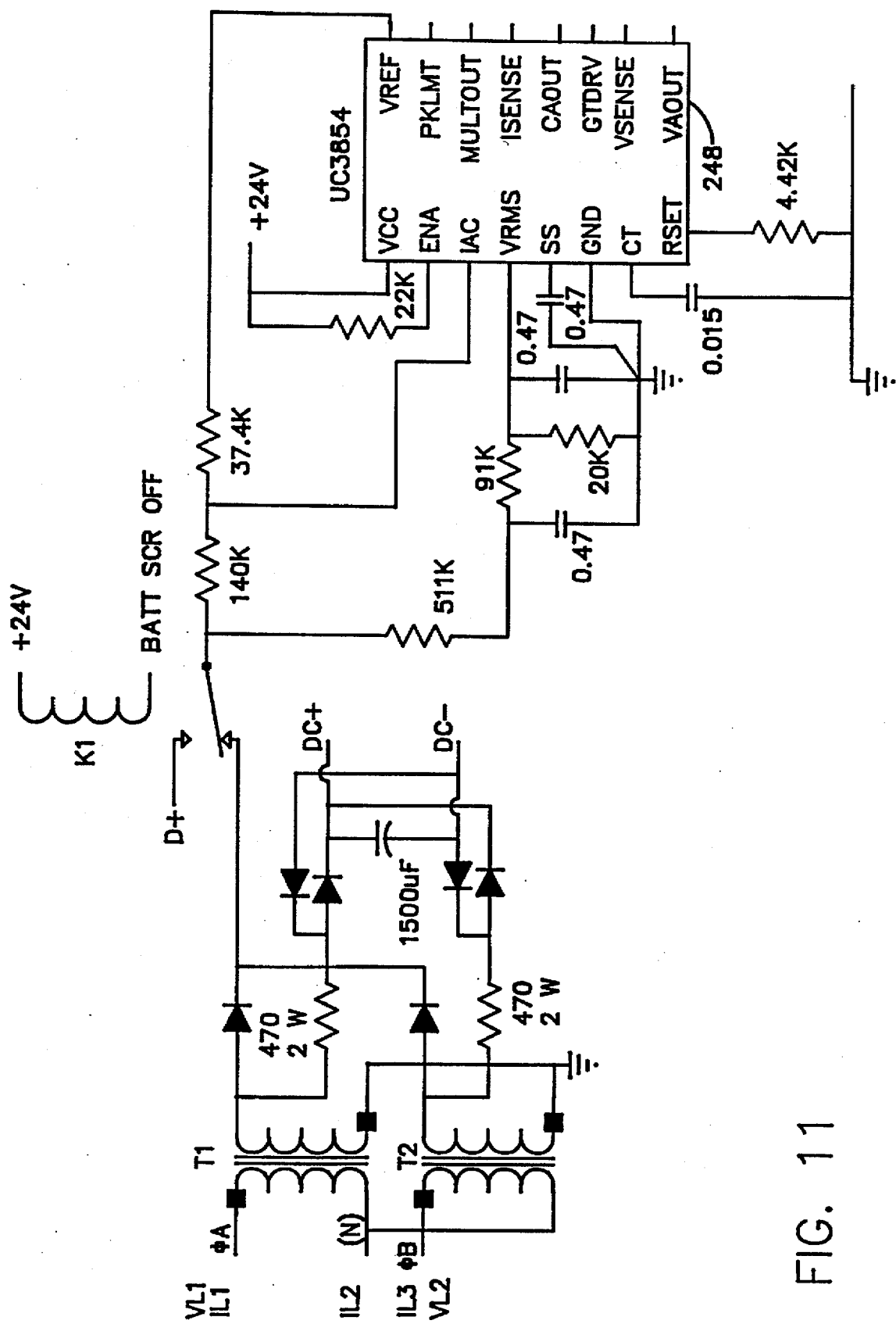
FIG. 11 is a schematic of input ac voltage sense circuit for the power factor correction signal to a negative boost regulator.

The boost regulator means 52 of FIGS. 1, 2 comprises a positive boost regulator circuit 54 shown in detail in FIG. 8 and a negative boost regulator circuit 56, shown in detail in FIGS. 10 and 11, which, in combination, provide a positive and a negative regulated dc voltages, DC+ and DC−, at positive and negative regulated voltage terminals 58 and 60 respectively with respect to the return 26. The successful use of a positive and negative boost regulator in combination with source selection for sourcing power from alternate sources, i.e. an ac voltage source via an input rectifier and filter means 18 rectifier and capacitor filter 20 or a battery means 38, to a single or multiple output dc-to-ac converter is believed to be a novel minimum complexity arrangement which also provides substantial power factor correction ability.

The use of the input rectifier and capacitor filter allows the use of the same design for a wide range of input frequency, while permitting the use of additional input phases by selecting the use of two additional diodes for each input power phase to be added. The invention topology is also suitable for use with wild frequency, single or multiple input power phase sources for input power without redesign.

Referring again to FIG. 1, the elements within phantom block 64, at the right of the FIGURE, represent a single phase dc-to-ac converter responsive to a positive and a negative regulated dc voltage, DC+ and DC−, at respective positive and negative regulated voltage terminals 58 and 60 for converting the positive and negative regulated dc voltages into at least a first uninterrupted sinusoidal output voltage at output terminal 16.

Referring to FIG. 2, the elements within phantom block 66 represent a two phase or multiple output dc-to-ac converter means coupled to convert the positive and a negative regulated dc voltage DC+ and DC− at respective positive and negative regulated voltage terminals 58 and 60 into at least a first and second uninterrupted sinusoidal output voltages at a first phase output terminal 16 and at a second phase output terminal 70 respectively. The circuit within phantom block 66 represents two circuits, each being identical to the topology of the single phase dc-to-ac converter circuit such as that shown in FIG. 1 in phantom block 64 but each being driven from a separately controlled reference signal via first and second reference signal lines 72, 74 respectively.

In the embodiments, of FIGS. 1 and 2, the dc-to-ac converter can be functionally arranged to sample the line voltages and to program the first and second reference voltages on the first and second reference signal lines 72, 74 to synchronize the output voltage to the loads, i.e. the first and second uninterrupted sinusoidal output voltages at output terminals 16 and 70, to match the frequency and phase of the respective input voltage sources φA and φB respectively.

An analog-to-digital converter 76 shown in FIG. 1 or 77 shown in FIG. 2 samples the input voltage sources φA as in FIG. 1 at 78, or φA and φB as in FIG. 2 on input mains or input power lines IL1, 78 and IL3, 80 with respect to the neutral line, IL2, 26 and make the real time sequence of the sampled values available as digital inputs to microprocessor controller 82. The voltage versus time relationship of a typical φA and φB voltage is illustrated as curve 79 and curve 81 respectively in FIG. 9a.

The continuous sequence of sampled values of the input voltages enables the microprocessor controller 82 to continuously have the amplitudes of the input mains φA and φB voltages available for use in generating and controlling the amplitude, frequency and phase relationships of reference voltage signals on the reference signal lines 72, 74.

In the alternative, the output voltages can be adjusted or programmed to provide an output service that is different in output voltage or frequency or both from that of the input voltage sources φA and φB on input mains or input power lines IL1, 78 and IL3, 80 with respect to neutral, IL2 26. Subject to limitations imposed by the values of the load, the switching frequency of the dc-to-ac converter, the value of the converter inductor inductance and its dc design current limitations, the output capacitance, the output frequency of the service can be made to approach or even equal zero on demand under the control of the microprocessor controller 82 by its control of the reference signal voltage on signal lines 72, 74.

Referring to FIGS. 1 and 2, input mains phase A and input mains phase B typically provide power at 120 Vac at 60 Hz for domestic U.S. applications and at 50 Hz with 220 Vac for European applications. The input voltages are delivered to the input rectifier and filter means 18 on input mains or input power lines IL1, 78 and IL3, 80 with respect to neutral, IL2 26. The input rectifier and filter 18 typically provides a conventional ballun wound or common mode inductor (not shown) as part of a pi-section filter to suppress common mode noise emissions on the input mains. Each of the input mains are typically fused with appropriate fuses for the application. Transient suppressors such as MOV devices from GE would be provided between each of the input mains and neutral. The components forming the pi-section filter, the fusing components and the transient suppression components are not shown.

The input rectifier and filter 18 typically uses a bridge rectifier that provides the unregulated positive dc voltage source D+ and the unregulated negative dc voltage source D− to capacitor filter 20. The rectifier typically provides a full wave rectified output to peak charge capacitor filter 20 on successive cycles. For a system rated to deliver 3 KW of output power, capacitor filter 20 would typically have a value of 0.47 μF. The unregulated buss voltages are substantially unfiltered and as shown in FIG. 9.

As an example, if the circuit of FIGS. 1 and 2 are operated with a total dc-to-ac converter output load of 3 KVA, with a two phase input of 120 Vac phase shifted at 120 degrees at input mains φA (phase A) 78 and φB (phase B) 80 with respect to the neutral terminal 26 as shown, the unregulated positive dc voltage at D+ will rise to 270 Vp with respect to the unregulated negative dc voltage D− and fall to a low of 15 to 85 V with respect to the unregulated negative dc voltage D− at two times the line frequency. At 60 Hz, the line frequency period is 16.66 ms. The ripple frequency period of the voltage at D+ with respect to D− would be approximately 4.166 ms for this example application and power service.

In a typical application, such as that shown in FIG. 1, the load is source selected via a source selection relay K1, 84 under the control of microprocessor controller 82 when the utility grid voltage is not acceptable. The microprocessor controller 82, in combination with corresponding analog and digital signal conditioning circuitry (not shown) monitors numerous performance parameters within the backed-up sinusoidal power supply 10 for the purpose of detecting a failure. At the onset of a failure, the microprocessor controller 82 initiates a pick or transfer signal to source selection relay K1, 84 to transfer the load from the output terminal 16 to the input main terminal at 78.

The source selection relay K1, 84 represents a microprocessor controlled source selector for the output load 14. The output service is normally provided by the dc-to-ac converter shown within phantom line 64, typically a half bridge inverter topology with totem pole switches such as pull-up IGBT switch Q1A, 86 and pull-down IGBT switch Q1B, 88. The IGBT switches are pulse width modulated typically at a wild frequency rate up to 45 Khz for a 50–60 Hz output frequency with inductor LA, 90 providing volt second averaging and instantaneous current control. In the two phase dc-to-ac converter 66 in FIG. 2, inductor LB, 94 also provides volt second averaging and instantaneous current control.

Figure 3:
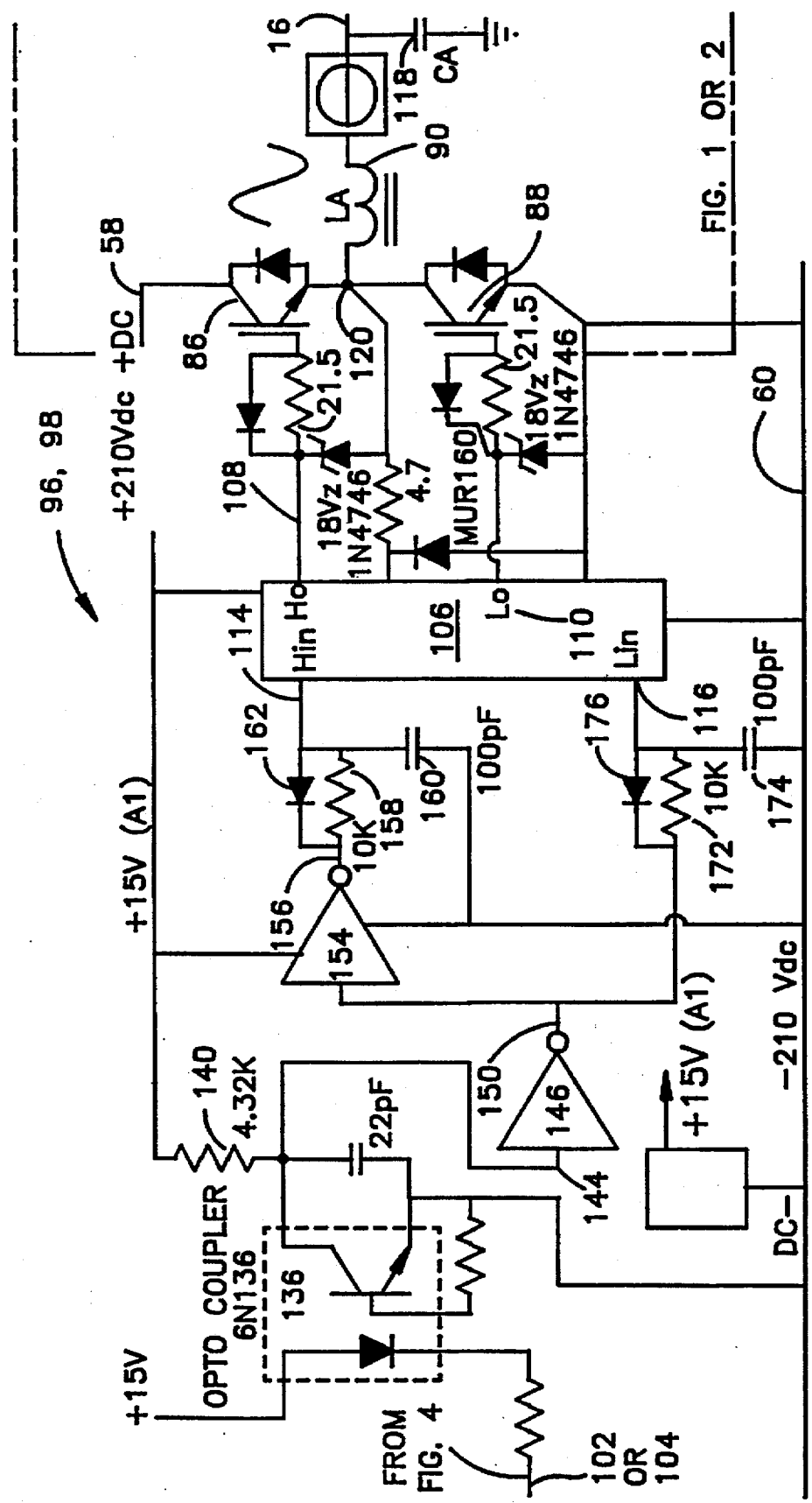
FIG. 3 is a schematic of an isolated converter half-bridge drive circuit.

FIG. 3 represents a preferred embodiment of an inverter drive circuit shown as block 96 in FIG. 1. The two phase dc-to-ac converter 66 in FIG. 2 requires a first phase inverter drive circuit 96 and a second phase drive circuit 98. The first and second phase inverter drive circuits 96 and 98 are each identical in topology to the circuit of FIG. 3. Input terminals 102 for the first phase inverter drive circuit input terminal and 104 for the second phase inverter drive circuit input terminal represent respective first and second phase inverter drive circuit input terminals. The first and second phase inverter drive circuit input terminals receive respective pulse width modulated input signals A and B (not shown) as outputs from the first and second phase control circuits 124 and 126 respectively.

Referring to FIG. 3, block 106 represents a high voltage MOS gate driver integrated circuit such as the IR2110 from the International Rectifier Company of El Segundo, Calif. The high voltage MOS gate driver integrated circuit provides a high side output channel signal at a high side output channel output terminal Ho 108 that can be referenced to a floating rail, 500 volts above the reference for the low side output channel at a low side output channel output terminal Lo 110. In the present application, the high side output channel is referenced to the half bridge output terminal and driver circuit output terminal 120, approximately + or −210 Vdc above or below neutral 26.

The pulse width modulated high side channel output signal at the high side output channel output terminal Ho 108 is substantially in phase with the high side channel input drive signal at high side output channel input terminal Hin 114. The pulse width modulated low side channel output signal at low side output channel output terminal Lo 110 is substantially in phase with the low side channel input drive signal at low side output channel input terminal 116. The resistor, diode and zener components between the Ho terminal 108 and the gate of the pull-up IGBT 86 and between the Lo terminal 110 and the gate of the pull-down IGBT 88 are conventional speed-up and gate to source protective elements known in the art.

The single phase dc-to-ac converter means 64, as partially depicted in FIG. 3, has an output capacitor 118, CA between output terminal 16 and neutral, the capacitor being in parallel with the load 14. The junction of the drain (emitter) of pull-up switch 86 and the source (collector) of pull-down switch 88 form the driver circuit output terminal 120. The inductor 90 couples the driver circuit output terminal 120 to the first phase output terminal 16. Each respective first or second phase inverter drive circuit, such as 96, 98 in FIG. 2, applies a respective pulse width modulated bi-polar voltage from the positive regulated dc voltage source +DC 58, +210 Vdc, and the negative regulate dc voltage source −DC, 60, −210 Vdc to the inductor 90, LA input terminal at the driver circuit output terminal 120 in response to a pulse width modulated driver signals from a respective control circuit means such as the first and second phase control circuits 124, 126 for the first and second phases in FIG. 2.

Figure 4:
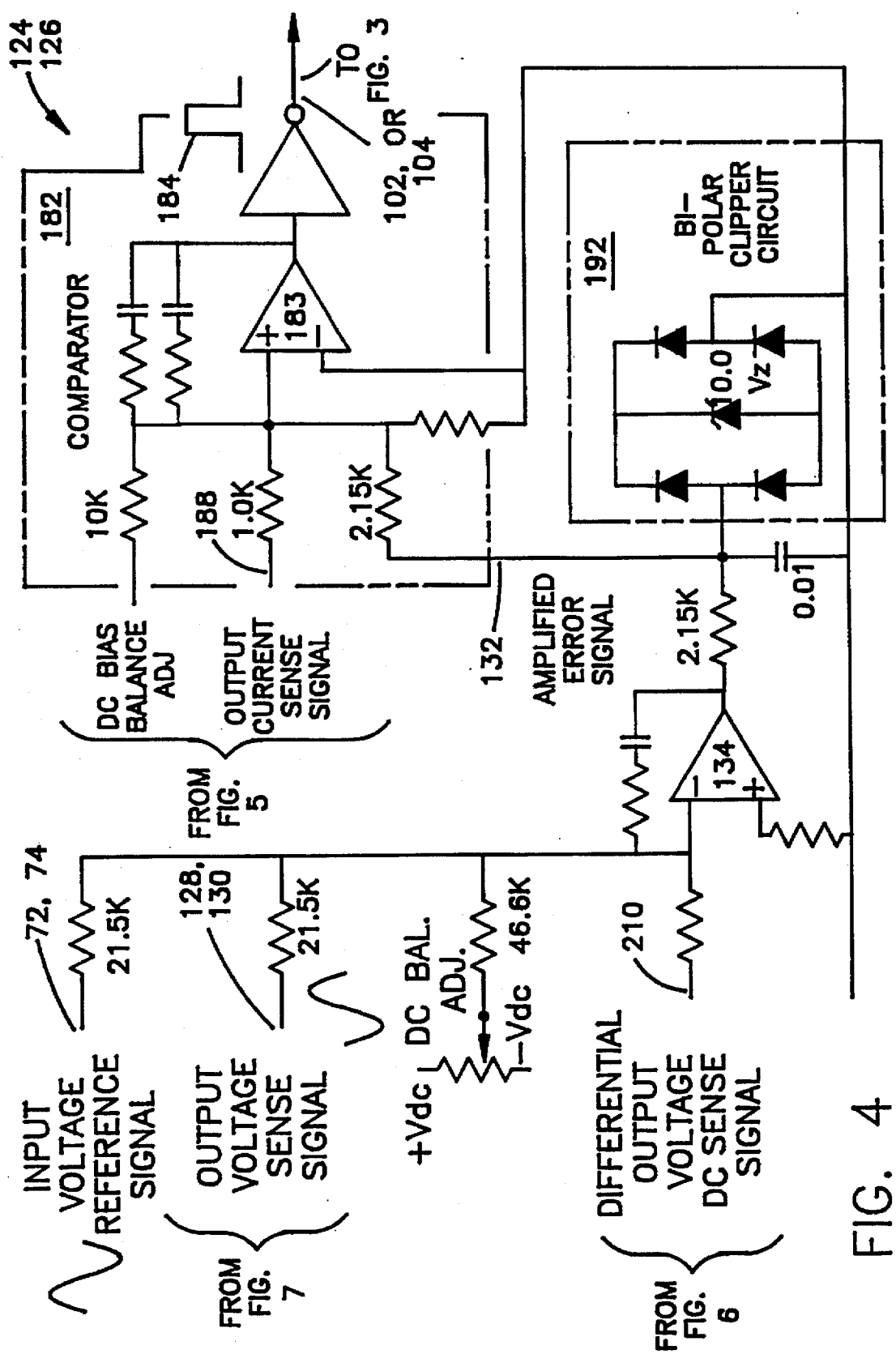
FIG. 4 is a schematic of a converter control circuit.

FIG. 4 provides a schematic functional representation of an enablement for a first or second control circuit 124, 126. Each respective phase control circuit 124, 126 is responsive to a respective reference signal, such as first and second reference signals on signal lines 72 and 74 discussed previously in connection with FIGS. 1 and 2.

Each respective phase control circuit 124, 126 also Senses and responds to its respective output voltage via first and second output voltage sense lines 128 and 130 as depicted in connection with FIG. 2, for providing an amplified error signal, at a point such as comparator input 132, having a first polarity to indicate that the output voltage is above a value related to the reference signal and an error signal having a second polarity to indicate that the output voltage is below value related to the reference signal.

By way of example, operational amplifier error amplifier 134 represents a means for summing the output voltage sense signal on the first output voltage sense line 128 with the first input voltage reference signal 72 to provide the amplified error signal at comparator input 132. The amplified error signal has a first polarity to indicate that the output voltage sense signal is above a value related to the reference signal and the amplified error signal has a second polarity to indicate that the output voltage is below a value related to the reference signal.

Operation of the first and second phase inverter drive circuits 96, 98 will now be further explained with reference to the circuit topology of FIG. 3. The first phase control circuit 124 provides a first phase pulse width modulated drive signal "A" to the first phase inverter drive circuit input terminal 102. A positive logic signal at A with respect to neutral produces a high at 144 into inverter 146 resulting in a low at 150. A low at 150 produces a high out of inverter 154 at 156. A low at 150 will also produce a low into the Lin input of 106 at input 116.

Resistor 158 and capacitor 160 provide a delay for a positively rising signal at output 156. Diode 162 provides a fast discharge of the voltage on capacitor 160 for a negatively going logic level at output 156. The voltage on capacitor 160 is coupled to the input of the high channel at the Hin terminal 114 in phase but slightly delayed for positively going signals at "A"102. Since the high voltage MOS gate driver 106 provides no inversion, the signal "A" is essentially in phase with the signal at the gate of pull-up switch 86 and the voltage at the output drive node 120 at the left side of LA 90.

The operation of resistor 172, capacitor 174, diode 176 duplicate the function and delays of corresponding components in the high channel. The absence of one inverter in the lower channel results in the signal at the low channel output Lo 110 being out of phase with the signal "A" at 102, and the low command occurring without substantial delay. The topology of FIG. 3 operates to insure a delay between the turn-on of the pull-up switch 86 and the turn-off of the pull-down switch 88 thereby providing protection against overlap with both switches being in the conductive state.

Referring again to FIGS. 1, 2 and 4, control circuits such as first phase control circuit 124 and the second phase control circuit 126, as characterized above, each receive an input voltage reference signal, (phase) from a respective first or second reference signal line, 72, 74 that is generated by a computer using software or data values from a read-only memory, the data values then being coupled to a digital-digital-to-analog converter, or from the output of a conventional reference oscillator such as a Hartley or Blocking, or Colpitts oscillator.

A sinusoidal reference voltage is used for a sinusoidal output voltage in the case of a backed-up ac power supply. The reference for a particular single phase dc-to-ac converter 64 is usually synchronized to the frequency and phase of the respective input power line.

It should also be understood that the amplitude and phase angle of the reference can be controlled as needed for the different input/output requirements of a particular UP System. The frequency of the input voltage reference can be manually adjusted or automatically controlled to program the dc-to-ac converter to operate as a frequency converter or to provide an output voltage with any frequency or phase corresponding to that of the input voltage reference.

Where the input voltage reference on signal line 72, or 74 originates from a microprocessor, computer or other form of digital industrial controller, the frequencies, amplitude and phase angle can be controlled by feeding different parameters into the software, as required, the time dependent output being delivered to signal lines 72 and 74 from a digital-to-analog converter.

FIG. 4 depicts a schematic functional representation of a portion of a control circuit means. The circuitry within phantom block 182 represents an embodiment of a comparator means or comparator circuit having a comparator 183 with a comparator output 184. The comparator 183 is responsive to an amplified error signal at comparator input 132 for providing successive pulse width modulated driver signals to the first phase inverter drive circuit input terminal 102. Each successive pulse has a first or second state, such as a logic 1 or a logic 0 state. Each successive state has a duration controlled to continuously drive the amplified error signal to a smaller absolute value.

In practice the amplified error signal will have a small characteristic sinusoidal envelope shape at the comparator input 132 at the line frequency of the output voltage (typically 60 Hz). But when the amplified error signal is compared with the instantaneous output current signal 188, the comparator output will be switching back and forth at a wild frequency of the inverter in the 10–20 Khz range as required to operate the output switches.

Figure 5:
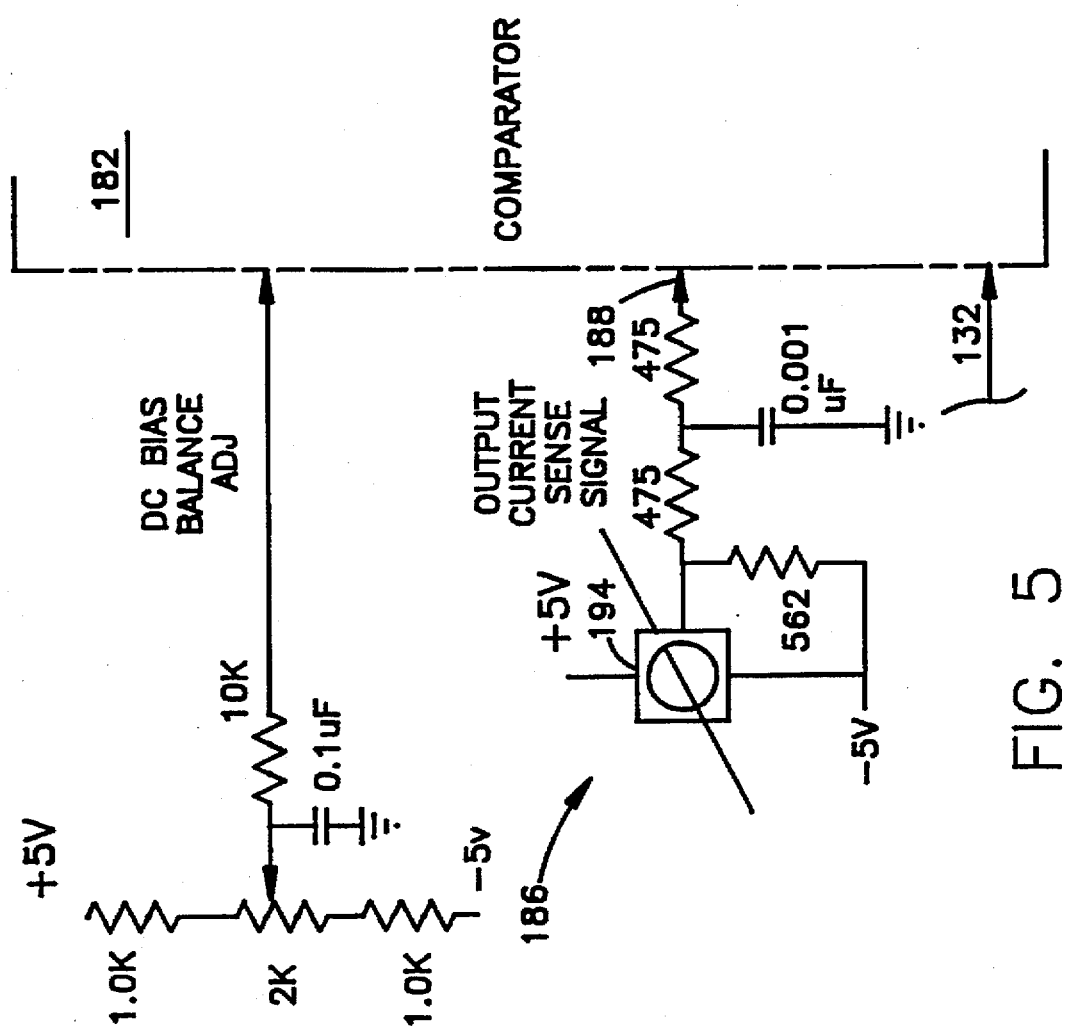
FIG. 5 is a schematic of a converter current sense signal conditioner.

In the embodiment of FIG. 4, the comparator means or comparator circuit 182 within control circuit 124, further comprises a current sense means, such as the current sense circuit 186 shown in more detail in FIG. 5. The current sense circuit 186 provides an output current sense signal on comparator input signal line 188 that faithfully represents the amplitude and phase of the instantaneous output current passing through the inductor 90 to the load 16.

The comparator circuit 182 comprises a comparator 183 followed by an inverter. The comparator circuit 182 sums the amplified error signal on comparator input 132 with the output current sense signal on comparator input signal line 188 to provide the successive pulse width modulated driver signals at the comparator output 184. The pulse width modulated comparator output signal 184 is coupled to the first phase inverter drive circuit input terminal 102 on FIG. 3. The inverted comparator output signal. The amplitude of the current sense signal is scalled to impose a limit on the amplitude of current sourced to the load.

Referring to the output current sense circuit of FIG. 5 showing the first phase hall effect current sensor 194 located at the right side of FIG. 3, if the amplified error signal on FIG. 4 assumes a value that produces a pulse width modulated comparator output signal 184 that is coupled to the first phase inverter drive circuit input terminal 102 on FIG. 3 that turns on the pull-up switch 86 and turns off the pull-down switch 88, as the current through inductor 90 increases, eventually the sense signal on the comparator input signal line will rise to a value that is sufficient to reverse the state of the signal at the first phase inverter drive circuit input terminal 102 causing the voltage to stop rising on the load and the current to stop increasing. The polarity of the current sense signal on the comparator current sense input signal line 188 is selected to cancel the amplified error signal at the comparator input 132 with increasing current values in response to an amplified but limited error signal on comparator input 132.

Referring again to the control circuit of FIG. 4, the diodes within phantom block 192 form a bi-polar clipper circuit. The zener is back biased for signals of positive or negative polarity applied on comparator input 132. The 10.0 Vz zener breaks down and allows current to flow with + or −10.0 V plus two forward diode drops totaling about 1.2 V. The bi-polar clipper circuit, with the values shown, therefore clamps the amplified error signal voltage at comparator input 132 to voltages within the range of ±11.2 V.

Referring to FIG. 5, since the range of the amplified error signal at comparator input 132 is limited to a predetermined range by the bi-polar clipper circuit 192 for amplified error signals of positive or negative polarity, the output current sense signal to the comparator current sense input signal line 188 on FIG. 4 is scaled to provide a signal that will cancel the maximum amplitude of the amplified error signal at comparator input 132 as the current out of the dc-to-ac converter output sensed by the first phase hall effect current sensor 194 reaches the maximum peak output current design limit. The scaling of the output current sense signal therefore imposes a limit on the amplitude of the instantaneous current sourced to the load.

The fidelity of the output voltage depends on the ability of the dc-to-ac converter to quickly correct for changes in the reference voltage and also load current. For this reason, the peak output current limit might typically be three or five times the rated output current thereby enabling the output voltage to faithfully track the form of the reference voltage while delivering linear or non-linear load currents to the load as required by the load.

The control circuits for the first and second phases, 124, 126 shown on FIG. 4 should be totally insensitive to non-linear loads as long as current required by a non-linear load does not reach the design peak output current limit. If a non-linear load requirement exceeds the output current limit, as when over loaded, the convertor limits the output load current to the load that results in distortion of the sinusoidal output voltage at the load 16 while protecting the pull-up and pull-down switches 86, 88 from failure.

The current sense circuit of FIG. 5 uses a first phase hall effect current sensor 194. The second phase circuit in FIG. 2 uses a second phase hall effect current sensor 196. Both hall effect current sensors are obtained from the F. W. Bell Company of Orlando, Fla. A model BB-100 hall effect sensor would be used in the current sense circuit of FIG. 5 with a design peak current limit of 75 amps. The full scale output of the BB-100 is ±5 V at 100A. A current of 10 A passing through the current sensor 194 will provide a 0.5 V signal. The current sense signal is then coupled to the comparator current sense input signal line 188 to the comparator circuit.

Figure 6:
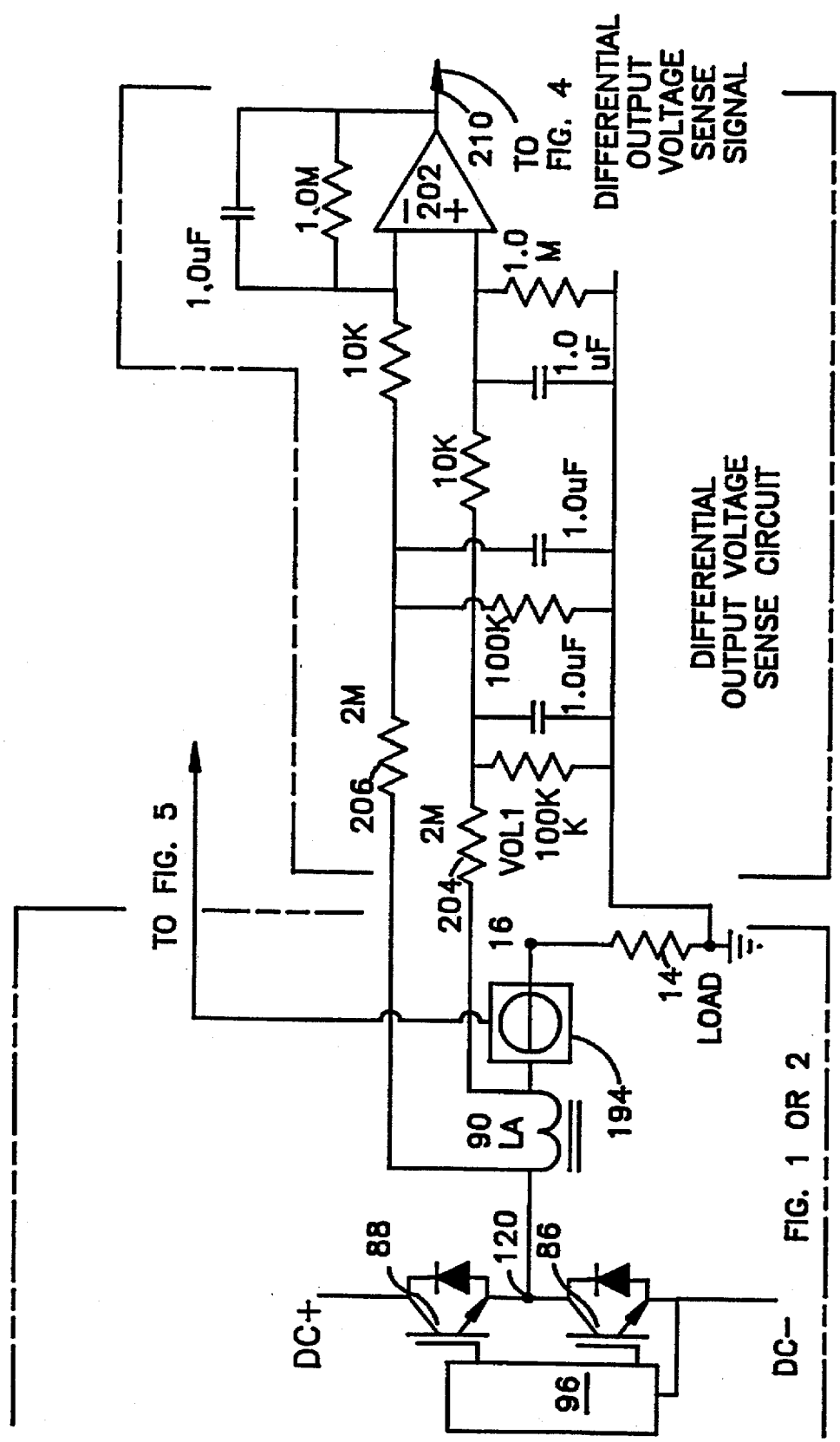
FIG. 6 is a schematic of a converter differential dc output current detection circuit.

FIG. 6 is a schematic of a converter differential dc output current detection circuit that monitors the high frequency switching voltage across inductor LA, 90 and provides a low-pass filtering and integration for the purpose of detecting any dc voltage component that might exist or develop across inductor LA. Any dc component of voltage is amplified by dc detection differential amplifier 202. Both input channels for dc detection differential amplifier 202 are balanced so that common mode transitions on the two inputs to first and second input resistors 204 and 206 produce a balanced result at the input to the amplifier and do not influence the error voltage at the input of the amplifier. Only the volt second average of the difference voltage across inductor LA, 90 will contribute to the output voltage out of differential amplifier 202 and to the differential output voltage dc sense signal input 210 to the error amplifier 134 on FIG. 4.

Figure 7:
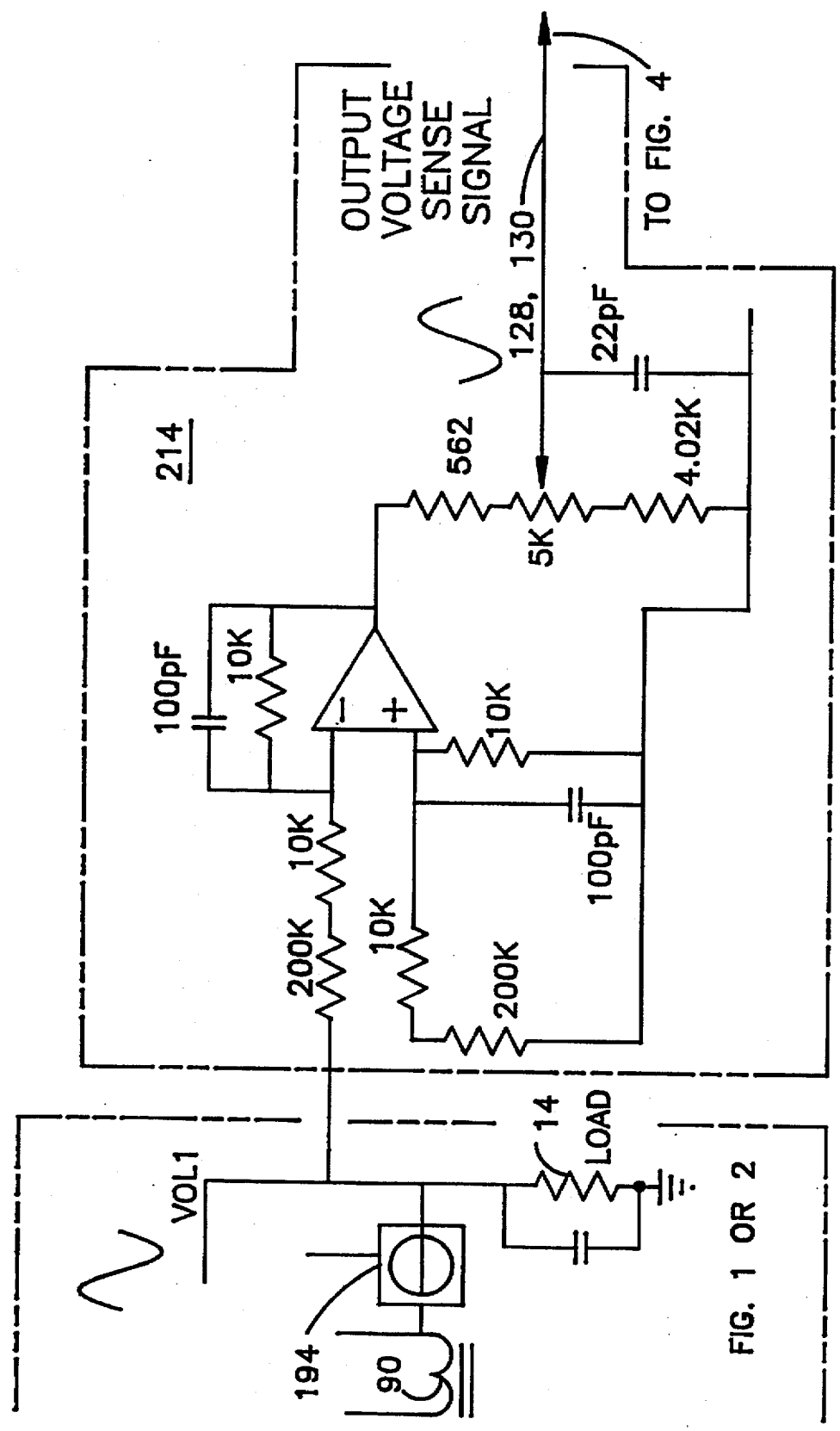
FIG. 7 is a schematic of a converter output voltage sense circuit.

FIG. 7 is a schematic of a converter output voltage sense circuit 214 that monitors the voltage applied to the load 14 at output terminal 16, and, depending on the respective phase, provides an output voltage sense signal to error amplifier 134 via the first output voltage sense line 128 or the respective second phase output voltage sense line 130. The circuit shown is an inverting low pass amplifier configuration with a 5K pot adjustment provided for final scaling of the required output voltage.

The pot adjustment (not shown as the "DC BAL. ADJ. on FIG. 7) is a balance trim adjustment that is provided to permit the circuit to be adjusted to balance out the effects from amplifier dc offsets, error contributions from balanced resistor and capacitor networks and from output switching and swinging diode asymmetry. Referring to FIG. 5, a similar function is provided by the "DC BIAS BALANCE ADJ." input into the comparator means circuit 182 on FIG. 4.

POSITIVE AND NEGATIVE BOOST CIRCUITS

Figure 12:
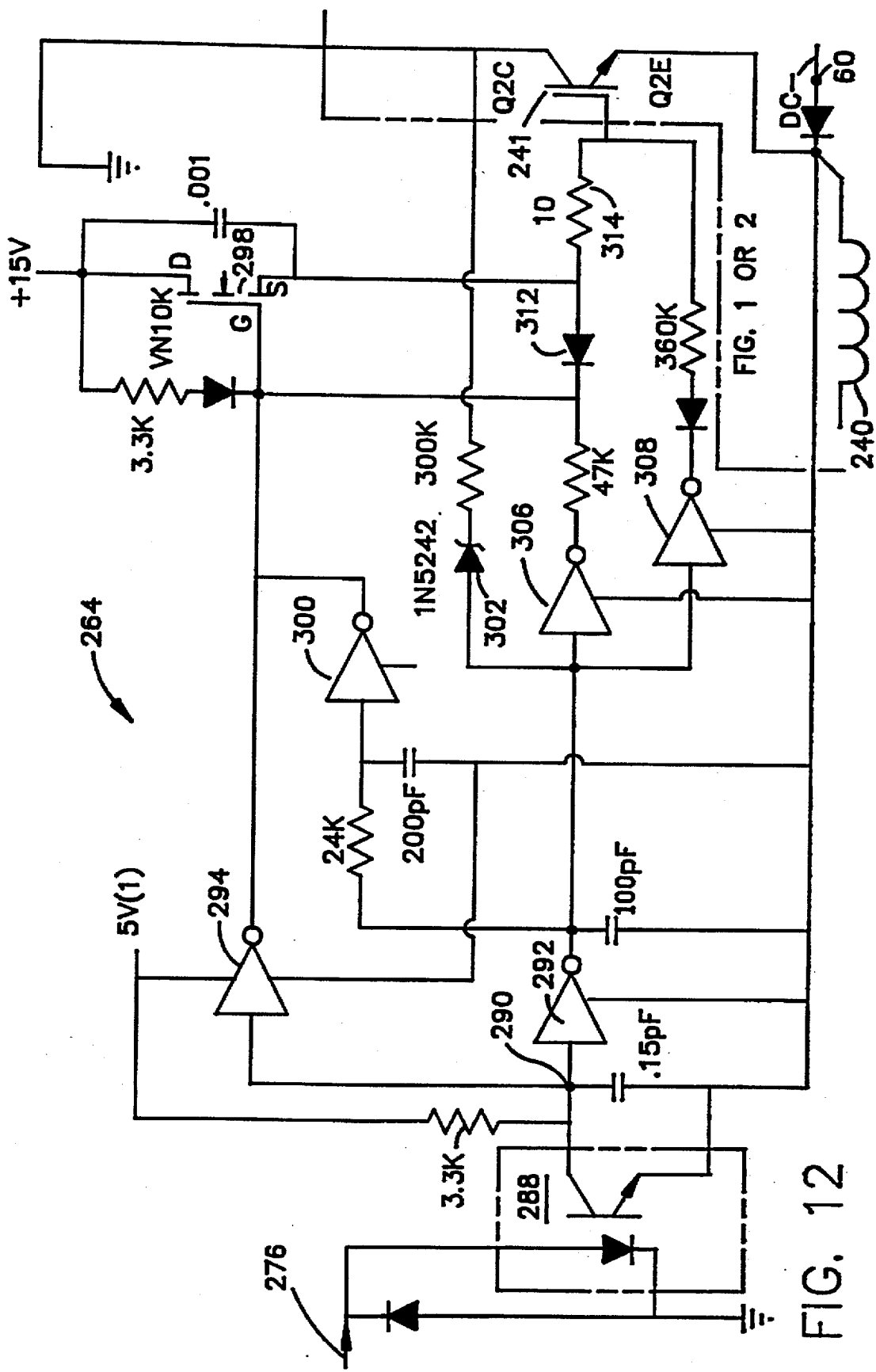
FIG. 12 is a schematic of a negative boost regulator isolated power switch drive circuit.

As stated above, phantom block 52 in FIGS. 1 and 2 represents a boost regulator means that comprises a positive boost regulator circuit 54 shown in detail in FIG. 8 and a negative boost regulator circuit 56, shown in detail in FIGS. 10, 11 and 12. These circuits, in combination, provide positive and a negative regulated dc voltages, DC+ and DC−, at positive and negative regulated voltage terminals 58 and 60 at levels of +210 V and −210 V respectively with respect to the return 26. Operation of the positive boost circuit will be explained with reference to FIG. 8.

As explained above, in discussing FIGS. 1 and 2, the voltage at the D− terminal 24 is an unregulated and substantially unfiltered negative dc voltage except for high frequency filtering by capacitor 20, and connected to the boost inductor L24, 240. When the input system input power at IL1, φA at 78 and IL3, φB at 80 is available, inductor L24, 240 is a single boost inductor.

By controlling the on time of the GTDRV (gate drive) signal to the negative boost switch 241, the negative boost circuit delivers a controlled amount of energy to the negative boost inductor L24 by switching the right end of negative boost inductor 240 to neutral and allowing current to increase in the inductor. As the current ramps up in the inductor, the energy stored in the inductor increases in accordance with a (½)*L*I^2 relationship. As the negative boost switch 241 is turned off, the energy previously stored in the negative boost inductor L24, 240 is transferred to the DC− terminal 60 by forward biasing clamp diode 244. The voltage at the filtered D− terminal 24 has a ripple voltage and current at line frequency equivalent to the number of input phases, typically twice the line frequency for a two phase input. The voltage swing is the line voltage peak swing with respect to the reference neutral 26. The negative boost inductor L24 has a high value of inductance that is designed to draw line current from the input source as the boost circuit operates in the continuous mode. Current in the inductor can, but is not required to return to zero, and for most power switching cycles does not return to zero. The value of the negative boost inductor is typically in the hundreds of microhenries and is in the range of 480 Uh as shown for 3 KVA and for 6 KVA systems as shown.

The negative boost inductor L24, 240 is rated by determining the maximum output current required from the negative regulated dc voltage terminal, 60, the derated negative power switch 241 current rating, the minimum voltage of second battery 44 at terminal 46, and the desired switching frequency. The energy stored in the negative boost inductor L24 is transferred, by turning on the negative boost switch 241, through clamp diode 244, negative boost current sensor 242, and onto capacitor 246.

Figure 9A:
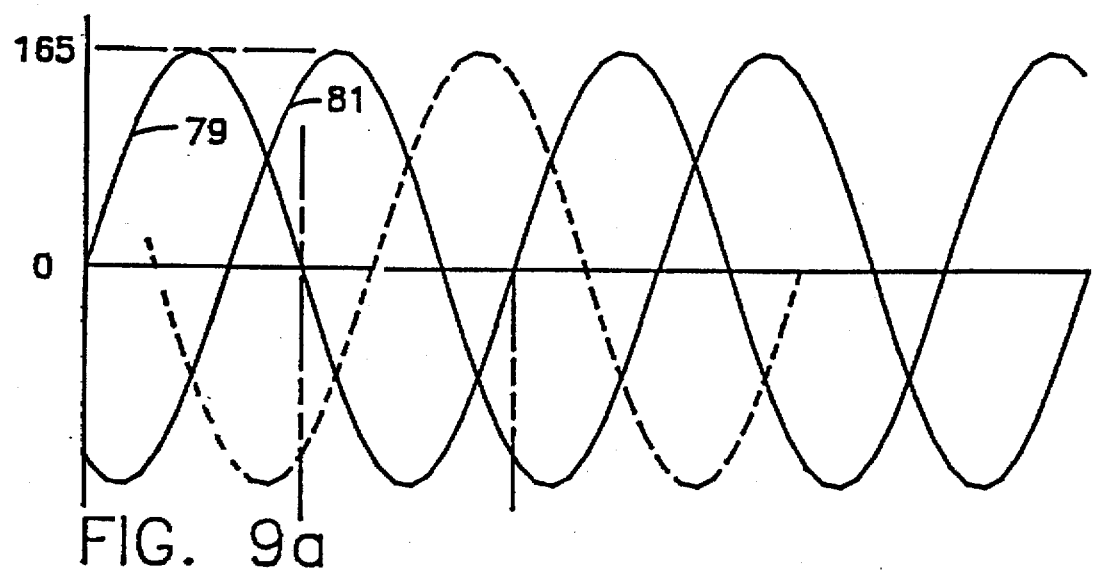
FIG. 9a–9e is a graphical depiction, of voltages and currents at points within the circuit.
Figure 9B:
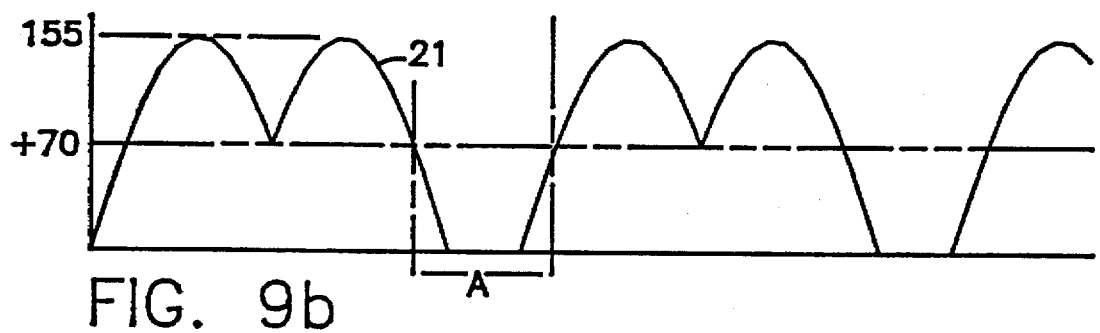
Figure 9C:
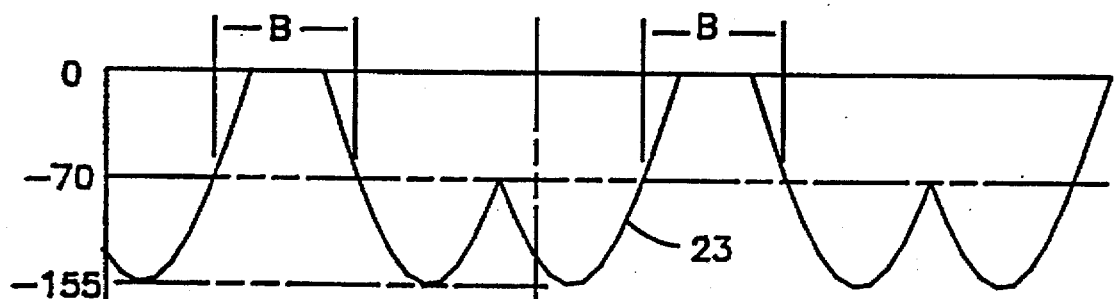

FIG. 9a graphically and schematically shows the approximate voltage applied by the input main IL1, φA at 77 and IL3 φB at 81 with respect to the neutral terminal at 26. The voltage waveform shown in phantom represents a missing third phase that could be, but which is not used in the topologies of FIGS. 1 and 2. The peak-to-peak swing is approximately 330 volts and the period is slightly in excess of 16.6 ms for 60 Hz and 120/208 Vac service.

FIG. 9b schematically shows the general shape of the voltage waveform of the unregulated positive dc voltage source voltage waveform 21 at D+ terminal 22 with respect to neutral. Substantial noise is present on this terminal but is not depicted for clarity. As the voltages at the D+ in FIG. 9b and the D− terminal shown in FIG. 9c enters the low mains voltage interval designated by bracketed intervals A and B respectively, discharge of the first and second batteries 40, 44 is avoided by the microprocessor interrupting operation of the positive and negative boost circuits 54, 56 during these respective intervals.

FIG. 9c shows the general shape of the voltage waveform 23 of the unregulated negative dc voltage source at D− terminal 24 with respect to neutral 26. Substantial noise is present on this terminal, due to the switching frequency of the boost and the dc-to-ac converters, but is not depicted for clarity.

Figure 9D:
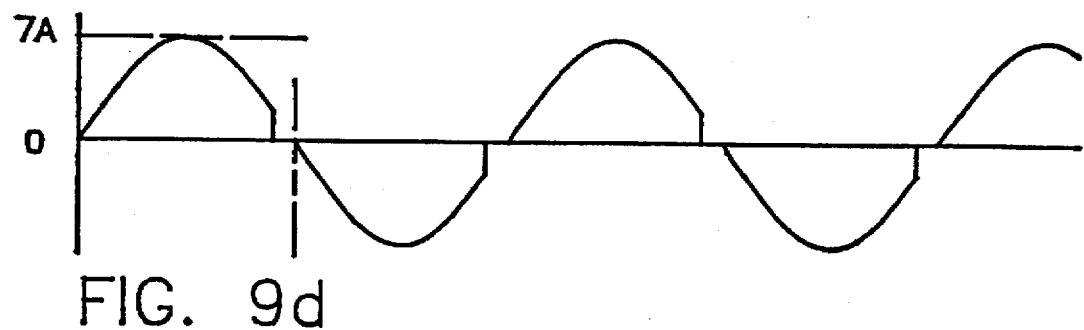

FIG. 9d depicts the shape of the input current passing through the IL1 service line past terminal 78 and into the rectifier 18. The current in this line is substantially in phase with the input main phase φA voltage and has a peak-to-peak swing of approximately 14 amps. The synchronization of the φA voltage and current for a circuit operating at or near rated power indicates that the invention circuit presents the input power source with a near unity power factor. Noise present on the current waveform is omitted for clarity.

Figure 9E:
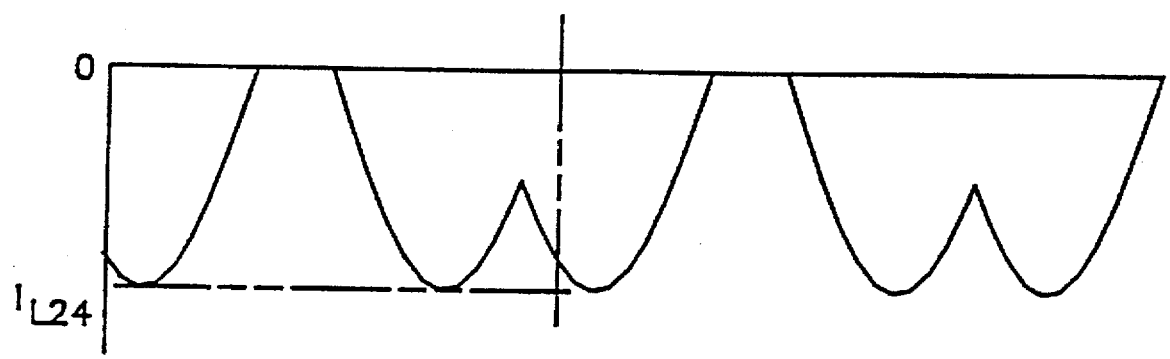

FIG. 9e shows the waveform of the current passing through negative boost inductor L24 in a timed relationship with the input voltage waveforms 79 and 81 above in FIG.

9a. The current through L24, i.e. $I_{L24}$, is substantially in phase with the voltage waveform of FIG. 9c. Switching noise present on the $I_{L24}$ current waveform is omitted for clarity.

FIGS. 8 and 10 show portions of the boost regulator means 52 in greater detail. FIG. 8 shows the positive boost controller circuit 54 and FIG. 10 shows a portion of the negative boost controller 56. Referring to FIG. 8, the positive boost controller 218 is a pulse width modulated controller such as the Unitrode UC 3854. This device is a High Power Factor Pre-regulator. The UC3854 is used as a controller for both the positive and negative voltage boost circuits. The primary components within the positive boost circuit 54 are the positive boost inductor L14, 220 current sensor 222, clamp diode 224, positive boost switch 243, output capacitor 228. The use of a current sensor scaling amplifier shown in the parent application has been deleted.

The voltage at the D+ output terminal 22 is an unregulated positive dc voltage that is under-filtered and clamped by diode 48 (shown in FIG. 1) to preclude this voltage from dropping below the battery 40 voltage minus the diode drop of diode 48. A battery voltage of 120 V with a lower limit of about 80 V is used for a 6 KVA system to keep the peak drain currents of the IGBT switches unchanged. In practice, the voltage at the D+output terminal 22 ripples at twice line frequency (for a two-phase input) between the peak line input voltage and the battery 40 voltage.

Use of a true current switch, in place of the clamp diode 48 or 50, improves the sinusoidal shape of the waveform of the input current throughout each input power cycle thereby improving the input power factor. Use of a true current switch, such as relay contact or a solid state transistor switch also prevents current from being drawn repeatedly from the first and second batteries 40 and 44 thereby increasing the service life of the batteries.

A positive filter inductor was used in series with L14 in the parent application but has been deleted to reduce cost and parts count. The positive filter inductor had a high value of inductance. A negative filter inductor was used in the negative boost circuit input voltage in a similar manner for the parent application.

By way of example, a system designed to operate from two phase service, 120/240 Vac input mains and to provide two phase output power at 120/240 Vac to a 2100 watt load at rated power would typically have 180 volts p-p ripple at the unregulated positive dc voltage terminal 22, and 0.5 volts of ripple on the positive regulated voltage terminal 58 while using a positive boost inductor L14, 220 having an inductance of 480 μH and an output capacitor 228 having 3000 μF. The positive battery 40 would typically have a no load voltage of 60 Vdc, a float voltage of 67.5 Vdc and a cut-off low battery limit loaded voltage of 50 Vdc.

The inductance value of boost inductor 220, L14, is established by determining the maximum output current required from the positive regulated voltage terminal. The peak boost inductor current is typically four times (210/50) this average value. A maximum on-time is established for the positive boost switch 243. This time is typically slightly less than the boost duty cycle period.

The inductance value for positive boost inductor 220, L14, is calculated based on the minimum battery buss voltage, peak inductor current and switching frequency. If $V=L*Di/Dt$, then $L=(V*Dt)/Di$ where Di is four times the average output current, V is the minimum battery buss voltage, and Dt is the maximum on time of the switch. The maximum switching frequency is based on the Dt max (maximum switch on time) plus the minimum time required to transfer the energy stored in the boost inductor The positive boost regulator circuit of FIG. 8 samples the DC+ voltage via first and second DC+ voltage sense resistors 234 and 236 with second sense resistor 236 being a variable resistor for adjusting and setting the final positive regulated dc voltage on terminal 58. Sense resistors 234 and 236 form a positive boost regulator circuit output voltage sense divider for scaling the positive regulated dc voltage on terminal 58 to approximately +7.5 Vdc for delivery to the VSENSE input of the UC 3854 High Power Factor Pre-regulator. The UC3854 is a component available from the Unitrode Corporation of Merrimack, N. H., 03054-0399. Use of the UC3854 is described in a publication titled "Linear Integrated Circuits Data And Applications Handbook" published in 1990 and available from the Unitrode Integrated Circuits Corporation, 7 Continental Boulevard, P.O. Box 399, Merrimack, N. H., 03054-0399.

The current sensed by hall effect current sensor 222 has a ramp triangular shape in the battery backup mode. The current waveform sensed by sensor 222 is shaped as a scaled ramp up followed by a ramp down signal. The sensed current signal waveform is coupled into the MULTOUT input of the positive boost controller 218. As the rising ramp voltage into the MULTOUT input exceeds an internal voltage threshold, and internal latch is reset shutting off the gate drive to positive boost switch 243 thereby allowing the current through positive boost inductor 220, L14, to pass through positive boost clamp diode 224 onto and into positive boost output capacitor 228. The internal voltage adjusts up and down as a function of the difference between the scaled VSENSE input and an internal precision voltage reference.

Continuing with FIG. 8, input IAC and the VRMS terminals on the positive boost controller 218 senses the substantially unfiltered D+ output terminal voltage. The signals on these terminals are high in value and after scaling down, are utilized as a signal by the UC3854 control logic to adjust the duty cycle of the controller to increase the power factor that is reflected onto the input mains by operation of the boost regulator circuit 54. The GTDRV terminal on the controller provides a gate drive signal to switch 243. The filter network between the ISENSE and the CA terminals are feedback compensation components. The VCC and the ENA terminals are power input and enable terminals.

System power supplies provide a regulated dc voltage to the VCC terminal and the enable ENA terminal is used by the computer or system controller to turn the boost regulators on and off after start-up. Precision regulators (not shown) provide +5 Vdc and −5 Vdc with respect to the return ground, the neutral terminal 26 to the positive boost hall effect current sensor, 222, CS1 which in turn provides a positive boost current sense voltage signal representing the instantaneous current that is passing through positive boost inductor, 220, L14 with respect to time to the 562 ohm positive boost current sensor scaling and termination resistor. The positive boost current sense signal is coupled via resistor network to the ISENSE input of the positive boost controller 218.

The D+ voltage signal is scaled by a network or resistors and capacitors to provide inputs to IAC and VRMS. The IAC and VRMS inputs are processed with the VSENS input to provide a variable threshold for an internal comparator within the UC 3854. The ISENSE is compared to the variable threshold voltage by the comparator and as the threshold is exceeded, the UC3854 turns off the GTDRV signal to the positive boost switch 243. The switch is commanded on, i.e. into the conduction mode at the next clock cycle.

Analog functions within the UC3854 control the variable threshold to permit a longer positive boost switch 243 on-time at lower D+ voltages and shorter on-time limits at higher D+ voltages. The threshold limits are reduced to low values for shorter on times as the DC+ voltage reaches a value that causes the VSENSE level to equal the value of a predetermined precision reference internal to the UC3854. The analog functions internal to the UC3854 are characterized to raise or lower the threshold limits of the internal variable threshold to cause the demand of the positive boost circuit to approximate that of a unity power factor load while regulating the DC+ voltage to be substantially constant.

Some principles of the positive boost regulator circuit component design apply to the components used in the negative boost circuit 56 shown in FIGS. 10, 11 and 12. One significant difference is that the emitter 232 of the negative boost switch 241 is not connected to neutral 26. FIG. 12 shows the isolation and level shifting circuit 264 for this application.

FIG. 10 shows the negative regulated dc voltage, DC− being sensed and scaled by a negative boost inverting amplifier 250 via negative boost sense input resistor 252. Since the logic power is referenced to the neutral and the negative voltage has to be regulated, an inverted differential mode amplifier 250 is used to scale the negative boost output voltage sense signal. The negative boost inverting amplifier 250 attenuates the signal sensed at the DC− terminal 60 and inverts the signal before providing the inverted negative boost output voltage sense signal to the VSENSE input of the negative boost controller 248. The output of amplifier 250 is connected to a −DC BIAS VOLT ADJ. pot 266, a 10K pot, via a 33.2K input scaling resistor 268. The 10K variable pot is used to adjust the negative regulated dc voltage DC− at the negative regulated voltage terminal 60 to its nominal value, typically, −210 Vdc. When balanced, negative boost inverting amplifier 250 provides an output signal to the VSENSE input pin of controller 248 at approximately +7.5 V.

In the event of input mains power failure, battery switches, such as clamp diodes 48, 50 turn on and as positive boost inductor 220, L14, and positive boost switch 243 boost the BT1+ voltage and regulate the positive DC Bus to +210 Vdc. Referring to FIG. 10 and 11, the negative boost inductor, 240, L24 and negative boost switch 241 operate to boost the BT1− voltage and regulate the negative DC Bus to −210 Vdc.

The power factor correction and input voltage compensation circuit is formed by balanced positive and negative boost circuits operating at a switching frequency of approximately 20 Khz. The positive boost switch 243 is referenced to neutral but the negative boost switch 241 is referenced to DC− at −210 Vdc. Positive boost inductor 220, L14, is the energy storage inductor for the positive boost circuit and negative boost inductor 240 is the energy storage inductor for the negative boost circuit. Windings shown on L14 and L24 in the parent application have been eliminated.

The clamp diodes for the positive and negative boost circuits are 224 and 244 respectively. The positive boost circuit output voltage of approximately +210 Vdc is supported by the positive boost output capacitors 228 at the DC+ terminal and the negative boost circuit output voltage of approximately −210 Vdc is supported by the negative boost output capacitor 246 at the DC− terminal 60.

Referring to FIG. 10, as in the case of FIG. 8, the current sensors are powered by precision regulators (not shown) that provide +5 Vdc and −5 Vdc with respect to the return ground, the neutral terminal 26. The negative boost hall effect current sensor 242 provides a negative boost current sense voltage signal representing the instantaneous current passing through negative boost inductor, 240, L24 with respect to time to the MULTOUT input of controller 248. The 562 ohm resistor to neutral is a scaling resistor. The negative boost current sense signal is coupled via a resistor network to the MULTOUT input of the negative boost controller 248. The filter components between the ISENSE pin and the CAOUT pin are feedback components. The voltage VAOUT directly controls the on time of the negative boost switch via the isolation and level shifting circuit 264 at input 276 of the isolation and level shifting circuit 264 depicted in FIG. 12.

In the parent application, scaling and level shifting amplifiers (not show here in FIG. 11) were used to scale and level shift the voltage on the D− terminal to the VRMS input of negative boost controller 248. This circuitry is eliminated in this preferred embodiment.

Transformers T1 and T2 are used as cost effective alternative to the solid state approach. The transformers are connected to provide isolated inverted and rectified images of the rectified voltages φA at 78 and φB at 80. In this way, the power factor corrections to the negative boost outputs are simultaneously matched and balanced with those corrections applied to the positive boost.

Continuing with FIG. 11, the ENA input to negative boost controller 248 is an enable pin that is used to turn-on and turn-off the negative boost regulator circuit 56. Voltage is applied to the VCC pin as logic power is available. The voltage into at the VRMS pin of controller 248 is a rectified and unfiltered dc voltage proportional to the RMS value of the input line voltage.

Referring to FIG. 10, Voltage at the VSENS pin of controller 248 is fed to an inverting amplifier within the UC3854 that is referenced to an internal reference voltage of +7.5 Vdc. The resulting signal voltage is multiplied by the signal into the IAC terminal on FIG. 11 and divided by a signal proportional to the square of the signal into the VRMS terminal within the negative boost controller 248. The result of this analog computation is available as a signal at the MULTOUT terminal which becomes a current threshold command and is used in controlling the output of the controller 248 to obtain a near unity power factor.

With each clock pulse the real current is compared with the current command and controls an internal RS flip flop to control the duty cycle of the GTDRV terminal signal on FIG. 10 within the negative boost controller 248.

FIG. 12 shows the circuitry comprising the isolation and level shifting circuit 264 which is to isolate the logic from the negative boost power switch, 232. It is a low cost version using only one open collector driver IC ULN 2004 and a FET (VN10KMA). In normal operation, with a high level signal at input 276, opto-coupler, 288 turns on forcing a low state at level shifted terminal 290. A low at 290 forces the output open collectors of the first inverters 292 and second inverter 294 to assume an open state. The 100 Pf capacitor at the output of inverter 292 is discharged as a result of the output of second inverter 292 having been low.

As the output of second inverter 294 transitions from a low to a high, it turns on speed-up FET 298. The inverted output of the first inverter 292 transitions from a low to a high as result of current from the 300K resistor passing through zener 302. The transition from a low to a high at the output of the first inverter is coupled via an RC delay circuit to the input of a third inverter 300 and also to the inputs of fourth and fifth inverters 306 and 308.

In normal operation, the collector voltage of the negative boost switch 310 drops to within a few volts of DC– before the input voltage to the inputs of the third, fourth and fifth inverters rises to a level sufficient to reach the input threshold for a high level input. As the collector voltage of the negative boost switch 241 drops below the voltage required to break down zener 302, the voltage rise on the 100 Pf capacitor stops. As a result, the input levels to each of these three inverters remains low during the remaining commanded on-time for the negative boost switch 241. A low at the input of the third inverter 300 permits the input to the speed-up switch to remain high thereby holding the gate of the negative boost switch high. A continuing low on the inputs of the fourth and fifth inverters allows their output collectors to remain open as the gate of the negative boost switch 241 remains high.

In the event of a fault, that prevents the collector voltage of the negative boost circuit from falling below the avalanche voltage of the zener 302, current passes through the zener limited by the 300K resistor and charges the 100 pF capacitor and the RC network formed by the 24K and 200 pF capacitor resulting in a high logic state into the inputs of the third, fourth and fifth inverters within a predetermined time period (typically within 2–4 us). A high into the input of the third inverter results in a low at the gate of the speed-up switch 298 and a hard low into the gate of the negative boost switch 241 from the output collector of the third inverter 300. The output collectors of the fourth and fifth inverters also assist in clamping the gate of the negative boost switch 241 to DC– for the remainder of the commanded on-time. This fault protection feature prevents the negative boost switch 241 from being commanded on into a fault for more than the predetermined interval established by the 300K resistor, the Vz of zener 302, the RC time constant of the 24K and 200 pF capacitor, the 100 pF capacitor and the input threshold and bias characteristics of the third, fourth and fifth inverters.

At the conclusion of a commanded on time, the high into the input of the isolator 288 goes low resulting in a high into the input of the first and second inverters. A high into the input of the second inverter 294 turns on its output switch thereby turning off the speed-up switch 298.

A high into the first inverter 292 turns on its output NPN thereby discharging the 100 pF capacitor and opening the collector outputs of the fourth and fifth inverters. The gate of the negative boost switch is positively switched to ground by the output NPN of the second inverter 294 via diode 312 and gate resistor 314.

As described above, different functions within the negative boost controller 248 control the variable threshold within the negative boost controller 248 IC to permit a longer power switch, 241 on-time at lower D– voltages and shorter on time limits at higher D– voltage to draw current from the whole cycle, to give reflected unity power factor load to the lines φA, 78 and φB, 83 and also regulate the DC–, 60, voltage to a pre-adjusted and set value. This is done as the DC– voltage reaches a value that causes the V sense level to equal the value of the precision internal reference level to the UC3854.

Figure 13:
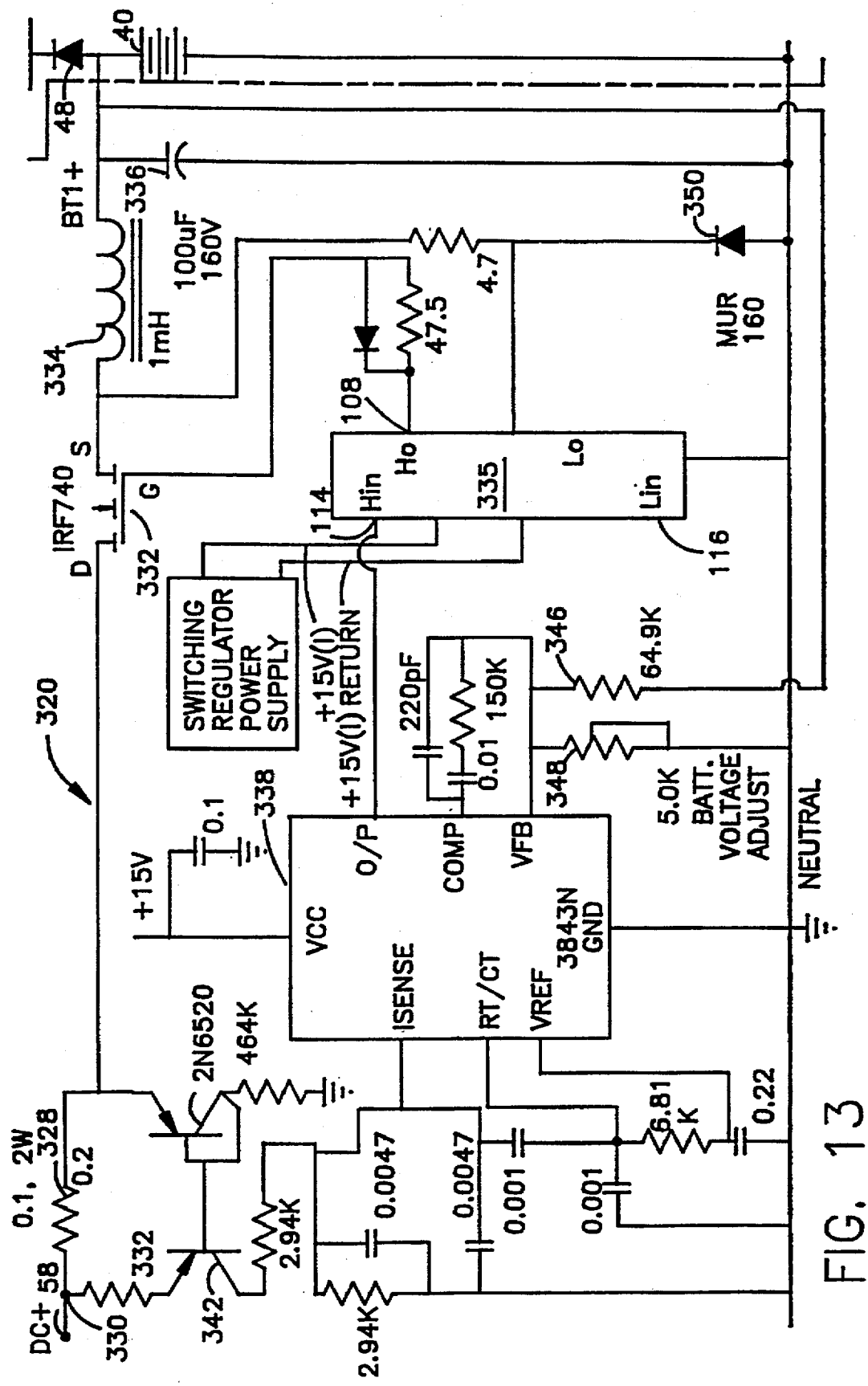
FIG. 13 is a schematic of a positive battery charging circuit.
Figure 14:
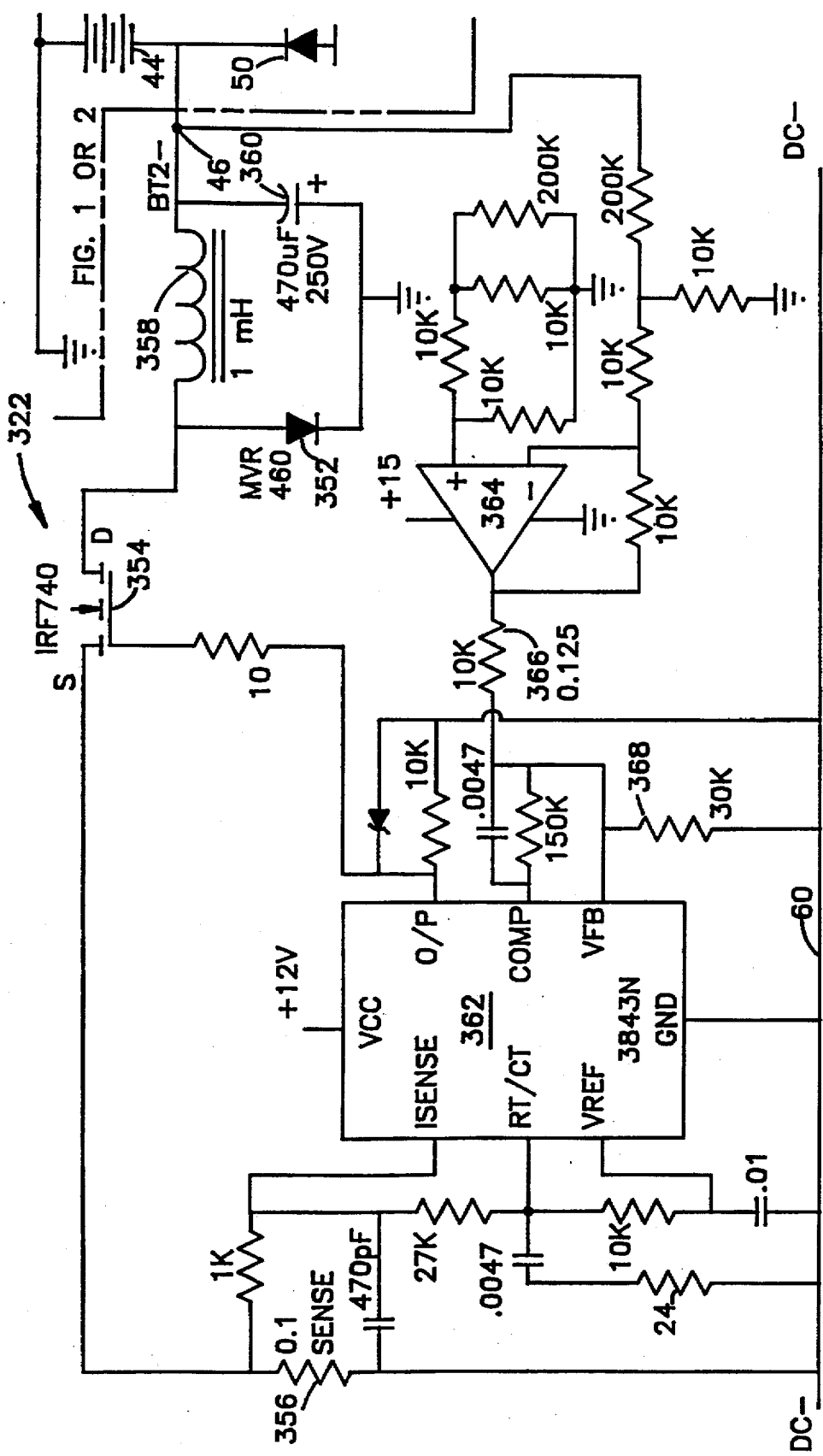
FIG. 14 is a schematic of a negative battery charging circuit.

FIGS. 13 and 14 are detailed schematics of the positive battery BTI+ charging logic block, 320 and the negative battery BTI– charging logic block, 322 respectively, shown as blocks in FIGS. 1 and 2. Referring now to FIG. 13, the positive regulated voltage terminal, DC+, 58 is connected to positive current sense resistor, 328 using signal line 330. The right side of the positive current sense resistor, 328 is connected to the drain of the positive switch FET, 332. The source of the positive switch FET is connected to the input side of the positive charger inductor, 334 which has a typical 3A rating. The output side of the positive charger inductor, 334 is connected to the positive charger filter capacitor, 336. The output side of the positive charger inductor, 334 is also connected to the terminal the first battery positive output terminal 42.

A 60 Vdc battery stack for a 3 KVA system typically has a float voltage of approximately 67.5 Vdc at the first battery positive output terminal 42 while the positive regulated voltage terminal DC+, 58, is at +210 Vdc. The positive battery BTI+ charging circuit 320 operates as a buck regulator in the current control mode and uses positive battery charger controller 338, a 3843N IC as a PWM controller.

All logic is referenced to neutral 26, but the source of the positive switch (FET) 332 is at about 67.5 Vdc when switched off and +210 Vdc when switched on. A high voltage MOS gate driver integrated circuit 339 such as the IR2110 from the International Rectifier Company of El Segundo, Calif. is used to accommodate the level shifted gate drive to FET 332. As explained above, the high voltage MOS gate driver integrated circuit provides a high side output channel signal at a high side output channel output terminal Ho 108 that can be referenced to a floating rail, 500 volts above the reference for the low side output channel at a low side output channel output terminal Lo 110.

In the present application, the high side output channel is referenced to the DC+, +210 Vdc above neutral 26. A pulse transformer was used in the parent application but is deleted in this application.

Current mode control requires a current sense signal so a current sense transistor 342, a 2N6520, is used as a current source to level shift the current signal supplied to the ISENSE terminal of the positive battery charger controller 338. The positive battery charger controller 338, a 3843N IC samples the BTI+ voltage via first and second BTI+ voltage sense resistors 346 and 348.

The filter network between the VFB and COMP terminals on the positive battery charger controller 338 are (feed back) compensation components. The positive and negative chargers are controlled by a computer (not shown) that monitors the state of the batteries. Diode, 350 is a free wheeling or clamp diode for the buck regulator.

FIG. 14 is a schematic for the negative battery BTI– charging logic block 322, that is powered from the negative regulated voltage terminal, DC–, 60. The negative regulated voltage terminal, DC–, 60 is connected to the source of negative switch FET, 354 through a 0.1 ohm negative current sense resistor, 356. The drain of the negative switch FET 354 is connected to the input of the negative charger inductor 358. The drain of the negative switch FET, 354 is also connected to the anode of the negative clamp diode, 352. The cathode of the negative clamp diode 352 is connected to neutral.

The negative charger inductor 358 is connected to the negative terminal of negative charger filter capacitor 360 which has typical value of 470 μF. The negative regulated voltage terminal, DC–, 60 has a typical voltage value of –210 V. The typical second battery nominal voltage BT–, 44 is –60 VDC with a maintained float voltage of –67.5 Vdc.

The negative battery BTI– charging circuit 322 operates as a buck regulator in the current control mode and uses negative battery charger controller 362, a 3483 N IC as a PWM controller. The circuit logic is referenced to the negative regulated voltage terminal, DC−, terminal 60. A negative charger amplifier 364 is used in the differential mode to scale down the sense voltage from the second battery negative output terminal 46 and also to invert the error signal. The negative battery charger controller 362 samples the BTI− voltages via the output of negative charger amplifier 364 and first and second sense resistors 366 and 368. The filter network between terminals VFB and CMP are compensation (feed back) components. The negative battery charger controller 362 provides a gate drive signal from the O/P terminal that is a duty cycle controlled signal, to drive negative switch FET, 354 to regulate the BTI− voltage. Each power cycle of the regulator is synchronized with a clock pulse received via input capacitor 370 from the master clock at 39 KHZ.

The signal sensed at VFB is compared with a precision internal reference voltage level to generate an internal error signal. The internal error signal is internally compared with the current feed back signal into the ISENSE pin for to control the on-time of each power cycle that starts with each clock cycle.

Figure 15:
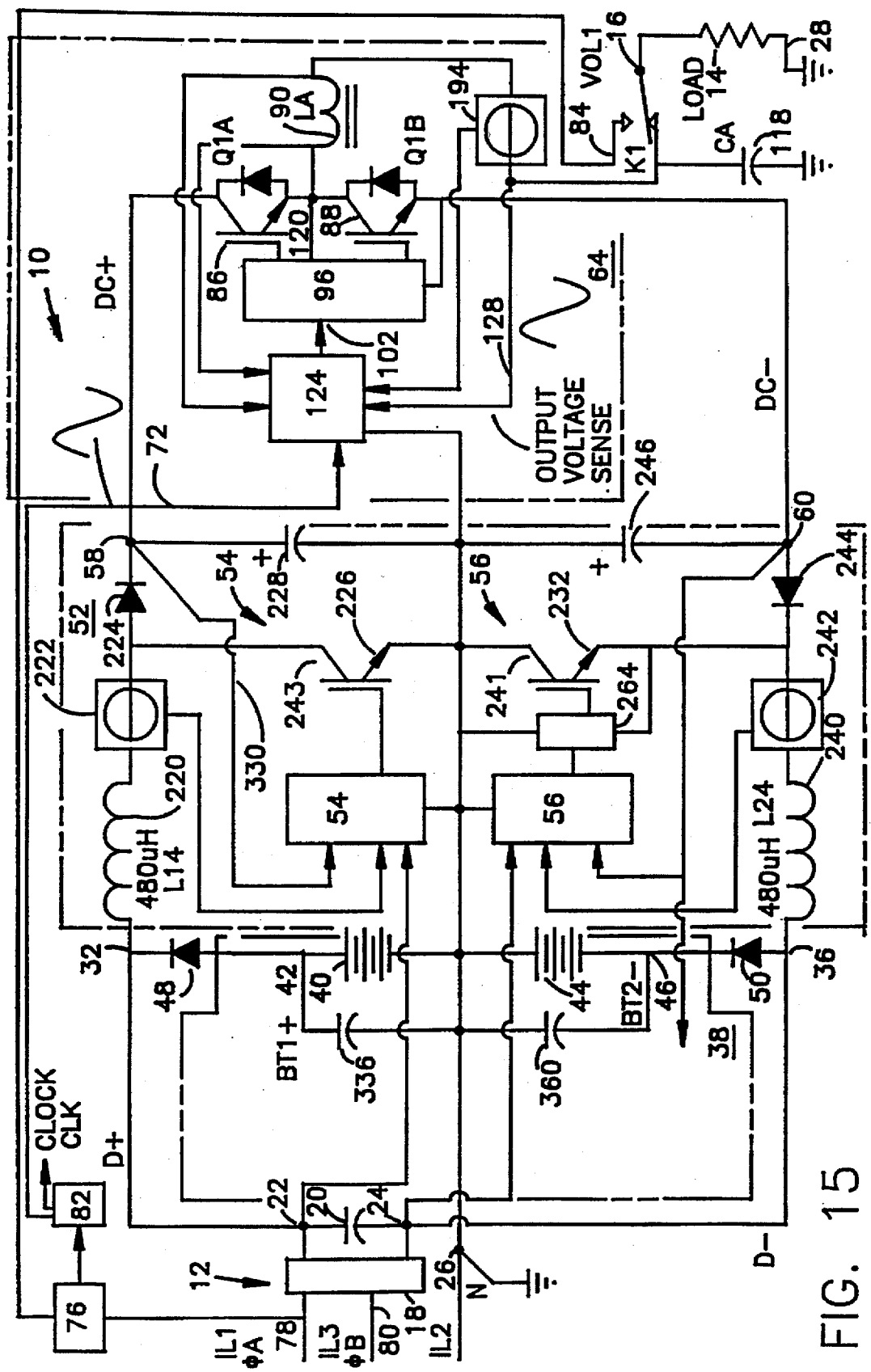
FIG. 15 is a schematic block diagram of a boost-input backed-up uninterruptible power supply powered from a two-phase sinusoidal input voltage source for providing a single phase uninterrupted output voltage to a load, (a third embodiment)

FIG. 15 is a modified version of the circuit of FIG. 1 that provides a third alternative embodiment with a reduction in complexity by use of a higher battery buss voltage, such as a buss voltage in excess of but in the range of 200 Vdc. In this alternative embodiment, the battery busses are moved to the output of the clamp diodes 224 and 244 respectively. The first battery positive output terminal 42 is connected to the cathode of the positive boost clamp diode 224 and the second battery negative output terminal 46 is connected to the anode of the negative boost clamp 244. This third alternative embodiment requires that the output voltage of the boost regulators be adjusted to provide a slight charge to the batteries as they approach a fully charged state. The positive and negative current switches 48, 50 are eliminated as are the positive and negative charging blocks 320, 322.

Figure 16:
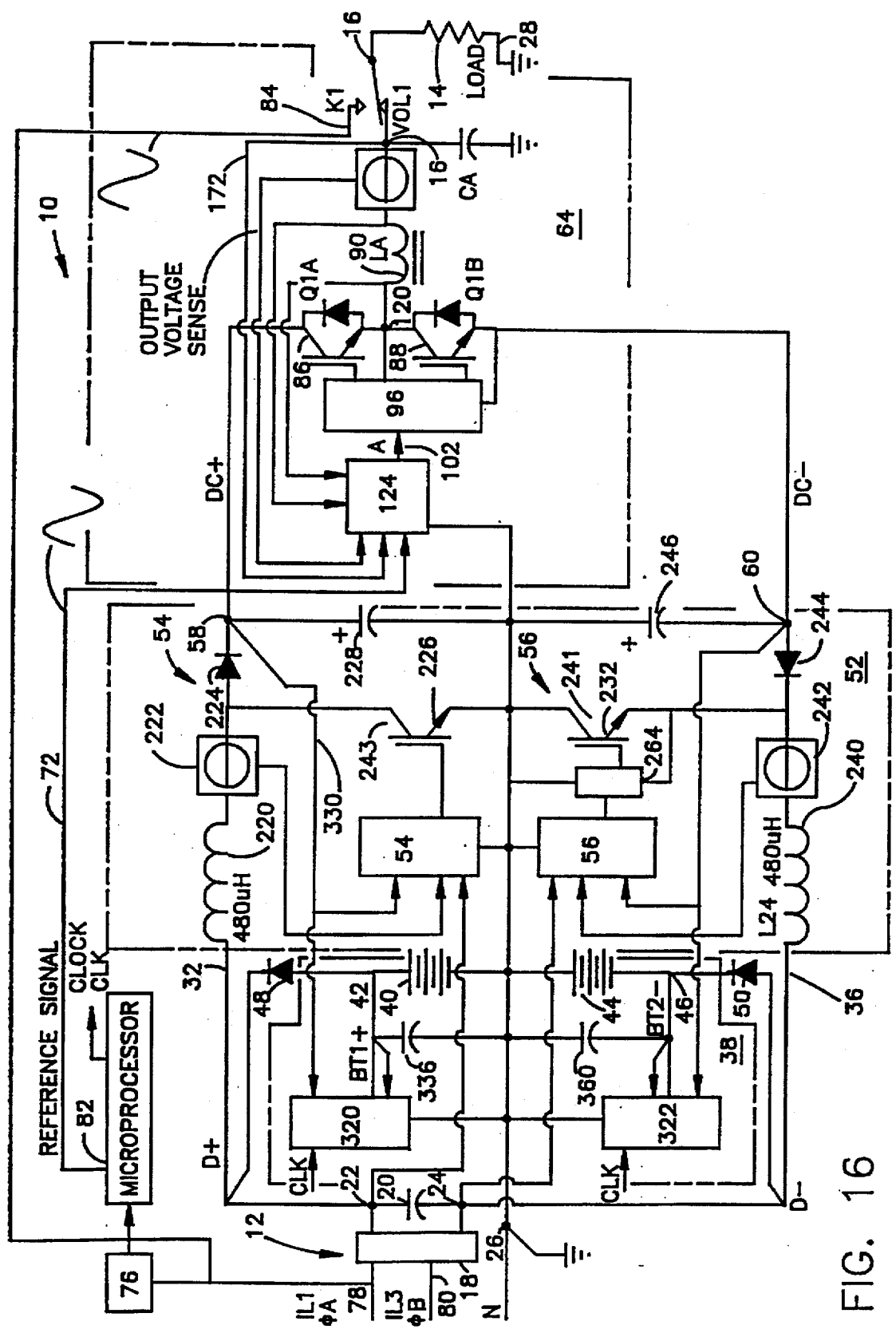
FIG. 16 is a schematic block diagram of a boost-input backed-up uninterruptible power supply powered from a two-phase sinusoidal input voltage source for providing a single phase uninterrupted output voltage to a load, (a fourth embodiment).

FIG. 16 is a modified version of FIG. 1 that provides a fourth alternative embodiment in which the first and second batteries 40, 44 are each low voltage battery stacks of typically 48 Vdc, which is much lower than the buss voltage of the input mains voltage 79 at IL1, 78 and 81 at IL3, 80. This fourth embodiment uses fewer battery cells in series for each battery than used by the batteries in the embodiment of FIG. 3. A reduction in the number of cells required by the embodiment of FIG. 16 implies greater economy and higher reliability than that the topology employed by the third embodiment of FIG. 15. The embodiment of FIG. 16 reintroduces the use of current switches 48 and 50 and the positive and negative battery charging circuits 320 and 322.

The positive and negative boost inductors 220, L14 and 240, L24 are designed to meet the inductance requirements of line input mains voltage at input terminals 78, 80, current distortion and also higher current ratings to compensate for the lower battery buss voltages at terminals 42, 46 respectively.

The positive and negative boost inductors 220, L14 and 240, L24 in the embodiment of FIG. 16 are designed for higher values of inductance, such as 800 μH, and with a current rating of 11 A for reduced input mains IL1 and IL3 current distortion.

The embodiments of the invention described herein represent preferred embodiments, and variations and modifications will suggest themselves to those skilled in the pertinent arts. Some possible modifications have been mentioned above such as using a PNP level shifter of transistor 136 in FIG. 3 in place of the Opto-coupler level shifter 288 shown in FIG. 12. A cyclic sequence of digital output values from a micro-processor to the input of a digital-to-analog converter could be used to enable the output of the digital-to-analog converter to supply the reference voltage signal on signal line 72 and or 74. The values for the sinusoidal reference signals on signal lines 72 and 74 of FIG. 2 could also be obtained from a predetermined sequence of outputs of a ROM (read only memory) or by generating the values required from an algorithm and sequentially delivering them to a digital-to-analog converter for application to the circuit of FIG. 4.

Current sensing can be achieved by the use of current sense transformers or low ohmic value current sense resistors in co-operation with appropriate scaling and level shifting circuitry in place of the hall effect elements 194, 196, 222 and 242 described. These and other modifications that may suggest themselves to those skilled in the pertinent arts should be considered to be within the spirit and scope of the present invention, as defined in the claims that follow.

I claim:

1. A boost-input backed-up uninterruptible power supply powered from an input voltage source for providing an uninterrupted output voltage to a load connected to a return, the boost-input backed-up uninterruptible power supply comprising:

an input rectifier coupled to the input voltage source for converting the input voltage source into at least a substantially unfiltered unregulated positive dc voltage source and a substantially unregulated unfiltered negative dc voltage source, each respective unregulated voltage source providing a respective unregulated dc voltage with respect to the return;

a battery means for providing respective positive and negative battery voltages at corresponding positive and negative battery output terminals;

a current switch means for isolating the unregulated positive and negative dc voltage sources from their respective battery voltages and for providing respective unregulated dc voltages equal to or greater than their respective battery voltage and for clamping each respective unregulated dc voltage to its respective battery voltage in response to loss of the input voltage source;

a boost regulator means coupled to receive power from the unregulated positive and negative dc voltage sources for providing a positive and a negative regulated dc voltage with respect to the return;

a dc-to-ac converter means responsive to a reference signal and coupled to convert the positive and negative regulated dc voltage into at least a first uninterrupted output voltage having an amplitude proportional to the reference signal for application to the load, said uninterrupted output voltage being sampled and scaled to provide an output voltage sense signal, the output voltage sense signal being combined with the reference signal to provide an amplified error signal, the dc-to-ac converter being responsive to the amplified error signal to adjust and scale the output voltage to minimize the amplified error signal.

2. The backed-up power supply of claim 1 wherein the dc-to-ac converter means further comprises:

a capacitor coupled in parallel with the load;

an inductor having an output terminal coupled to the load and an input terminal; and, a driver circuit coupled to the positive regulated dc voltage and the negative regulated dc voltage for applying a pulse width modulated bi-polar voltage to the inductor input terminal in response to a pulse width modulated driver signal.

3. The backed-up power supply of claim 1 wherein the boost regulator means comprises:

a positive boost inductor having an input terminal coupled to the unregulated positive voltage source and an output terminal;

a positive boost capacitor having a first terminal coupled to the return and a second terminal coupled to the positive regulated terminal;

a positive boost clamp diode having a cathode coupled to the positive regulated terminal and an anode coupled to the positive boost inductor output terminal;

transistor switching means having a control grid responsive to a pulse width modulated boost control signal and a conduction channel for coupling the positive boost inductor output terminal to the return in response to the pulse width modulated boost control signal assuming a first state and for opening the conduction channel in response to the pulse width modulated boost control signal assuming a second state; and pulse width modulated control circuit means responsive to the positive regulated dc voltage and coupled to the unregulated positive dc voltage source for producing a pulse width modulated signal characterized to drive the positive regulated dc voltage to a predetermined level while also adjusting the pulse width in response to the unregulated positive dc voltage source to move a power factor correction in the direction of unity.

4. The backed-up power supply of claim 2 wherein the dc-to-ac converter means comprises:

a control circuit means responsive to the amplified error signal and output current sense signal for providing the pulse width modulated driver signals, each pulse width modulated driver signal having a first or second state, each state having a duration characterized to substantially continuously drive the amplified error signal to a smaller absolute value.

5. The backed-up power supply of claim 4 wherein the control circuit means, within the dc-to-ac converter circuit, further comprises:

means for sensing the output current to the load and for providing the output current sense signal scaled to characterize the instantaneous amplitude and polarity of current passing from the inductor output terminal to the load; and, comparator means for summing the amplified error signal with the output current sense signal to provide the pulse width modulated driver signals that impose a limit on the amplitude of current sourced to the load.

6. The backed-up power supply of claim 4 wherein the control circuit means, within the dc to ac converter circuit, further comprises:

means for summing the output voltage sense signal with the reference signal to provide the amplified error signal, the amplified error signal having a first polarity to indicate that the output voltage sense signal is above a value related to the reference signal and the amplified error signal having a second polarity to indicate that the output voltage is below value related to the reference signal.

7. The backed-up power supply of claim 4 wherein the control circuit means further comprises:

means for sensing the output current to the load and for providing an output current sense signal that characterizes the instantaneous amplitude and polarity of current passing from the inductor output terminal to the filter capacitor and the load; and, comparator means for summing the amplified error signal with the output current sense signal to provide the pulse width modulated driver signals further characterized to impose an absolute limit on the amplitude of current sourced to the load.

8. The backed-up power supply of claim 4 wherein the control circuit means further comprises:

means for summing the amplified error signal and the output current sense signal and for providing the pulse width modulated driver signal having a polarity and duration characterized to limit the output current through the inductor to a predetermined maximum value and to continuously drive the amplified error signal to a smaller absolute value.

9. A boost-input backed-up uninterruptible power supply powered from a sinusoidal input voltage source for providing an uninterrupted sinusoidal output voltage to a load, the power supply comprising:

an input rectifier coupled to the sinusoidal input voltage source to convert the input voltage source into at least a substantially unfiltered unregulated positive dc voltage source and a substantially unfiltered unregulated negative dc voltage source, each respective unregulated dc voltage source providing a respective unregulated dc voltage with respect to a return;

a positive boost inductor having an input terminal coupled to the unregulated positive dc voltage source and an output terminal;

a positive boost capacitor having a first terminal coupled to the return and a second terminal coupled to a positive regulated voltage terminal;

a positive boost clamp diode having a cathode coupled to the positive regulated voltage terminal and an anode coupled to the positive boost inductor output terminal;

a first transistor switching means having a control grid responsive to a first pulse width modulated boost control signal and a conduction channel for coupling the positive boost inductor output terminal to the return terminal in response to the first pulse width modulated boost control signal assuming a first state and for opening the conduction channel in response to the first pulse width modulated boost control signal assuming a second state;

a first pulse width modulated control circuit means responsive to a positive regulated dc voltage and to the unregulated positive dc voltage source for producing the first pulse width modulated boost control signal for driving the positive regulated dc voltage to a predetermined level;

a negative boost inductor having an input terminal coupled to the unregulated negative dc voltage source and an output terminal;

a negative boost capacitor having a first terminal coupled to the return and a second terminal coupled to a negative regulated voltage terminal;

a negative boost clamp diode having an anode coupled to the negative regulated voltage terminal and a cathode coupled to the negative boost inductor output terminal;

a second transistor switching means having a control grid responsive to a second pulse width modulated boost control signal and a conduction channel for coupling the negative boost inductor output terminal to the return terminal in response to the second pulse width modulated boost control signal assuming a first state and for opening the conduction channel in response to the second pulse width modulated boost control signal assuming a second state;

a second pulse width modulated control circuit means responsive to the negative regulated dc voltage and to the unregulated negative dc voltage source for producing the second pulse width modulated boost control signal for driving the negative regulated dc voltage to a predetermined level;

a first battery for providing a positive battery voltage at a first battery positive output terminal with respect to the return;

a second battery for providing a negative battery voltage at a second battery negative output terminal with respect to the return;

a positive current switch interposed between the first battery positive output terminal and the positive filter inductor output terminal for isolating the unregulated positive dc voltage source from the first battery positive battery terminal for unregulated positive dc voltage source values equal to or greater than the positive battery voltage and for clamping the unregulated positive dc voltage to the positive battery voltage in response to loss of the input voltage source;

a negative current switch interposed between the second battery negative battery output terminal and the negative filter inductor output terminal for isolating the unregulated negative dc voltage source from the second battery negative battery terminal for unregulated negative dc voltage source values having an absolute value equal to or greater than the absolute value of the negative battery voltage and for clamping the unregulated negative dc voltage value to the negative battery voltage in response to loss of the input voltage source; and a dc-to-ac converter coupled to convert the positive regulated dc voltage and the negative regulated dc voltage into at least a first uninterrupted sinusoidal output voltage for application to the load.

10. The backed-up power supply of claim 9 wherein said first pulse width modulated control circuit means comprises:
means responsive to the unregulated positive dc voltage source to move a power factor correction in the direction of unity; and wherein said second pulse width modulated control circuit means comprises:
means responsive to the unregulated negative dc voltage source to move a power factor correction in the direction of unity.

11. A boost-input backed-up uninterruptible power supply powered from a sinusoidal input voltage source for providing an uninterrupted sinusoidal output voltage to a load connected to a return, the boost-input backed-up uninterruptible power supply comprising:

an input rectifier coupled to the input voltage source and converting the input voltage source into at least an unregulated and substantially unfiltered positive dc voltage source and a substantially unfiltered unregulated negative dc voltage source, each respective unregulated voltage source having a respective unregulated dc voltage value with respect to the return;

a positive boost inductor having an input terminal coupled to the unregulated positive voltage source, and an output terminal, a single boost inductor being connected to the input terminal;

a negative boost inductor having an input terminal coupled to the unregulated negative voltage source and an output terminal a single boost inductor being connected to the input terminal;

a positive battery referenced to the return for providing a positive battery voltage at a positive battery output terminal;

a positive battery clamp diode having a cathode connected to the positive filter inductor output terminal and its anode connected to the positive battery positive battery output terminal; and, a negative battery referenced to the return for providing a negative battery voltage at a negative battery output terminal;

a negative battery clamp diode having an anode connected to the negative filter inductor output terminal and its cathode connected to the negative battery, negative positive battery output terminal; and, a boost regulator coupled to receive power from the unregulated positive and negative dc voltage sources and providing a positive and a negative regulated dc voltage with respect to the return; and a dc-to-ac converter responsive to a reference signal and coupled to convert the positive and negative regulated dc voltage into at least a first uninterrupted sinusoidal output voltage having an amplitude continuously proportional to a reference signal.

12. The boost-input backed-up uninterruptible power supply power supply of claim 11 wherein the dc-to-ac converter comprises:

a capacitor coupled in parallel with the load;

an inductor having an output terminal coupled to the load and an input terminal; and a driver circuit coupled to the positive regulated dc voltage and the negative regulated dc voltage, the driver circuit applying a pulse width modulated bi-polar voltage to the inductor input terminal in response to a pulse width modulated driver signal.

13. The boost-input backed-up uninterruptible power supply power supply of claim 12 wherein the boost regulator comprises:

a positive boost capacitor having a first terminal coupled to the return and a second terminal coupled to the positive regulated terminal;

a positive boost clamp diode having a cathode coupled to the positive regulated terminal and an anode coupled to the positive boost inductor output terminal;

a first transistor switch having a control grid responsive to a first pulse width modulated boost control signal and a conduction channel that couples the positive boost inductor output terminal to the return terminal in response to the first pulse width modulated boost control signal assuming a first state and for opening the conduction channel in response to the first pulse width modulated boost control signal assuming a second state; and a first pulse width modulated boost control circuit responsive to the positive regulated dc voltage and to the unregulated positive dc voltage source, the pulse width modulated control circuit producing the first pulse width modulated boost control signal characterized to drive the positive regulated dc voltage to a predetermined level while also adjusting the first pulse width in response to unregulated positive dc voltage source to move a power factor correction in the direction of unity.

14. The boost-input backed-up uninterruptible power supply of claim 13 wherein the boost regulator further comprises:

a negative boost capacitor having a first terminal coupled to the return and a second terminal coupled to the negative regulated voltage terminal;

a negative boost clamp diode having an anode coupled to the negative regulated voltage terminal and a cathode coupled to the negative boost inductor output terminal;

a second transistor switch having a control grid responsive to a second pulse width modulated boost control signal and a conduction channel for coupling the negative boost inductor output terminal to the return terminal in response to the second pulse width modulated boost control signal assuming a first state and for opening the conduction channel in response to the second pulse width modulated boost control signal assuming a second state;

a transformer and rectifier circuit responsive to the sinusoidal input voltage source for providing a scaled and inverted unregulated dc voltage source;

a second pulse width modulated boost control circuit responsive to the negative regulated dc voltage and to the scaled and inverted unregulated negative dc voltage source, the second pulse width modulated boost control circuit producing said second pulse width modulated boost control signal characterized to drive the negative regulated dc voltage to a predetermined level while also adjusting the pulse width in response to the unregulated negative dc voltage to move the power factor correction in the direction of unity.

15. The backed-up power supply of claim 12 wherein the dc-to-ac converter further comprises:

an output current sense circuit for providing an output current sense signal scalled to represent the output current;

a converter control circuit for difference adding the reference signal and a scaled sample of the uninterrupted sinusoidal output voltage to provide an amplified error signal; and a comparator circuit responsive to the output current sense signal and the amplified error signal providing a pulse width modulated driver signal having a first state in response to the output current sense signal exceeding the amplified error signal and a pulse width modulated driver signal having a second state in response to the amplified error signal exceeding the output current sense signal, pulse width modulated driver signal state having a phase and duration characterized to continuously drive an amplified error signal to a smaller absolute value.

16. The backed-up power supply of claim 15 wherein the converter control circuit further comprises:

a bi-polar clamping circuit for limiting the absolute value of the amplified error signal to a predetermined value; and wherein, the output current sense signal is scaled to exceed the absolute value of the amplified error signal and reverse the state of the pulse width modulated driver signal in response to the output current exceeding a predetermined limit.

* * * * *